US010794047B2

(12) United States Patent
Arimatsu et al.

(10) Patent No.: US 10,794,047 B2
(45) Date of Patent: Oct. 6, 2020

(54) DISPLAY SYSTEM AND CONSTRUCTION MACHINE

(71) Applicant: Komatsu Ltd., Tokyo (JP)

(72) Inventors: Daiki Arimatsu, Hiratsuka (JP); Yuki Shimano, Suita (JP); Takeshi Takaura, Hoffman Estates, IL (US); Jason Anetsberger, Northbrook, IL (US)

(73) Assignee: KOMATSU LTD., Tokyo (JP)

( * ) Notice: Subject to any disclaimer, the term of this patent is extended or adjusted under 35 U.S.C. 154(b) by 48 days.

(21) Appl. No.: 15/208,796

(22) Filed: Jul. 13, 2016

(65) Prior Publication Data

US 2017/0016211 A1 Jan. 19, 2017

Related U.S. Application Data

(60) Provisional application No. 62/192,684, filed on Jul. 15, 2015.

(51) Int. Cl.
*E02F 9/26* (2006.01)
*G09G 5/00* (2006.01)
(Continued)

(52) U.S. Cl.
CPC ............. *E02F 9/264* (2013.01); *E02F 3/841* (2013.01); *E02F 3/844* (2013.01); *E02F 9/261* (2013.01);
(Continued)

(58) Field of Classification Search
CPC . E02F 9/264; E02F 3/844; E02F 3/841; E02F 9/261; E02F 3/32; G01S 19/14; G06F 3/01; G06F 3/1423; G06F 3/147; G09G 5/003; G09G 5/377; G09G 2340/12; G09G 2380/10
(Continued)

(56) References Cited

U.S. PATENT DOCUMENTS 7,643,938 B2 1/2010 Adachi et al.
8,498,806 B2 7/2013 Fukano et al.
(Continued)

FOREIGN PATENT DOCUMENTS

CN 1527993 A 9/2004
CN 103080432 A 5/2013
(Continued)

OTHER PUBLICATIONS

International Search Report dated Aug. 16, 2016, issued for PCT/JP2016/070959.

*Primary Examiner* — Ke Xiao
*Assistant Examiner* — Kim Thanh T Tran
(74) *Attorney, Agent, or Firm* — Locke Lord LLP

(57) ABSTRACT

Provided is a display system including: a display unit which displays an image; a vehicle body position data acquisition unit which acquires vehicle body position data indicating a position of a vehicle body supporting a work machine; a process position data storage unit which stores process position data indicating a process position of a process target processed by the work machine; and a display controller which displays an image indicating the process position based on the process position data and an image indicating a specific position of the vehicle body on the display unit.

18 Claims, 14 Drawing Sheets

(51) Int. Cl.
  *G09G 5/377* (2006.01)
  *G06F 3/01* (2006.01)
  *G01S 19/14* (2010.01)
  *E02F 3/84* (2006.01)
  *E02F 3/32* (2006.01)
(52) U.S. Cl.
  CPC ............... *G01S 19/14* (2013.01); *G06F 3/01* (2013.01); *G09G 5/003* (2013.01); *G09G 5/377* (2013.01); *E02F 3/32* (2013.01)
(58) Field of Classification Search
  USPC ........................................................ 345/629
  See application file for complete search history.

(56) References Cited

U.S. PATENT DOCUMENTS

| | | | |
|---|---|---|---|
| 8,903,604 B2 | 12/2014 | Fukano et al. | |
| 8,965,642 B2 | 2/2015 | Johnson et al. | |
| 9,493,929 B2 | 11/2016 | Kurihara et al. | |
| 2004/0210371 A1 | 10/2004 | Adachi et al. | |
| 2005/0027420 A1* | 2/2005 | Fujishima ............. | E02F 9/2045 701/50 |
| 2008/0147282 A1* | 6/2008 | Kormann ............. | A01B 69/003 701/50 |
| 2013/0158784 A1* | 6/2013 | Fukano ................. | E02F 9/2033 701/34.4 |
| 2013/0158785 A1 | 6/2013 | Fukano et al. | |
| 2013/0158797 A1* | 6/2013 | Fukano ................... | E02F 9/264 701/36 |
| 2015/0308081 A1* | 10/2015 | Takaura .................. | E02F 3/437 701/50 |
| 2016/0010312 A1* | 1/2016 | Kurihara ................ | E02F 3/435 701/36 |
| 2016/0193920 A1* | 7/2016 | Tsubone .................. | E02F 9/261 701/36 |

FOREIGN PATENT DOCUMENTS

| | | |
|---|---|---|
| CN | 103080434 A | 5/2013 |
| JP | 06-317090 A | 11/1994 |
| JP | 2002275949 A | 9/2002 |
| JP | 2004-107926 A | 4/2004 |
| JP | 2008179940 A | 8/2008 |
| JP | 2014-129676 A | 7/2014 |
| KR | 10-2013-0044338 A | 5/2013 |
| KR | 10-2015-0067369 A | 6/2015 |
| WO | 2006106685 A1 | 10/2006 |
| WO | 201407721 A2 | 1/2014 |
| WO | WO-2014/054354 A1 | 4/2014 |

\* cited by examiner

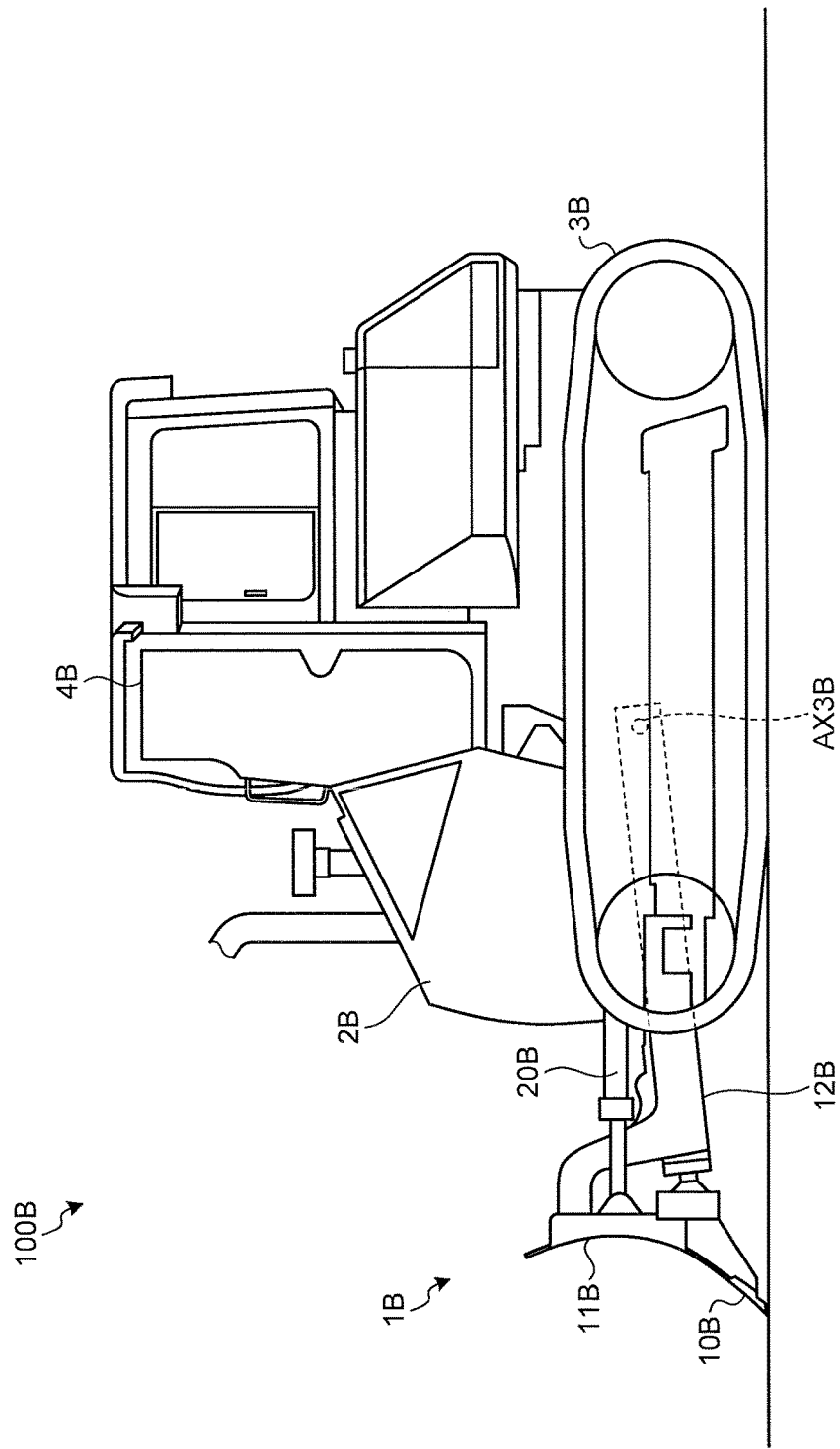

DISPLAY SYSTEM AND CONSTRUCTION MACHINE

TECHNICAL FIELD

The present invention relates to a display system and a construction machine.

BACKGROUND ART

When a construction machine performs a work, a positioning operation between a process target and a construction machine needs to be performed. Patent Literature 1 discloses a technique of assisting a positioning operation between a process target and a construction machine by a display system.

CITATION LIST

Patent Literature

Patent Literature 1: International Publication No. 2014/054354

SUMMARY

Technical Problem

When the construction machine performs the work for the process target, the construction machine needs to be moved to an appropriate position. For that reason, there has been a demand for a technique of assisting the positioning operation between the process target and the construction machine for an operator of the construction machine.

An aspect of the invention is to provide a display system capable of assisting the positioning operation between the process target and the construction machine. Further, another aspect of the invention is to provide a construction machine capable of performing the highly precise positioning operation for the process target.

Solution to Problem

According to a first aspect of the invention, there is provided a display system comprising: a display unit which displays an image; a vehicle body position data acquisition unit which acquires vehicle body position data indicating a position of a vehicle body supporting a work machine; a process position data storage unit which stores process position data indicating a process position of a process target processed by the work machine; and a display controller which displays an image indicating the process position based on the process position data and an image indicating a specific position of the vehicle body on the display unit.

According to a second aspect of the invention, there is provided a display system which is mounted on an excavator including a work machine and a vehicle body supporting the work machine, wherein the work machine includes a working member including a blade tip and a connection member connecting the working member and the vehicle body to each other, wherein the vehicle body includes an upper swing body which is able to swing about a swing axis while being supported by a lower travel body, wherein the display system comprises: a display unit which displays an image; a vehicle body position data acquisition unit which acquires vehicle body position data indicating a position of the vehicle body; a process position data storage unit which stores process position data indicating a process position of a process target including a center of a channel constructed by the work machine in a width direction; a blade tip position data acquisition unit which acquires blade tip position data indicating a position of the blade tip; and a display controller which displays an image indicating the process position based on the process position data, an image indicating a specific position of the vehicle body, and an image indicating the position of the blade tip based on the blade tip position data on the display unit together.

According to a third aspect of the invention, there is provided a construction machine including the display system according to the first or second aspect.

Advantageous Effects of Invention

According to the aspects of the invention, provided is the display system capable of assisting the positioning operation between the process target and the construction machine. Further, according to the aspects of the invention, provided is the construction machine capable of performing the highly precise positioning operation for the process target.

BRIEF DESCRIPTION OF DRAWINGS

FIG. 15 is a side view illustrating an example of a construction machine.

DESCRIPTION OF EMBODIMENTS

Hereinafter, embodiments according to the invention will be described with reference to the drawings, but the invention is not limited thereto. The components of the embodiments to be described below can be appropriately combined with one another. Further, there is a case in which a part of the components are not used.

First Embodiment

Figure 1:
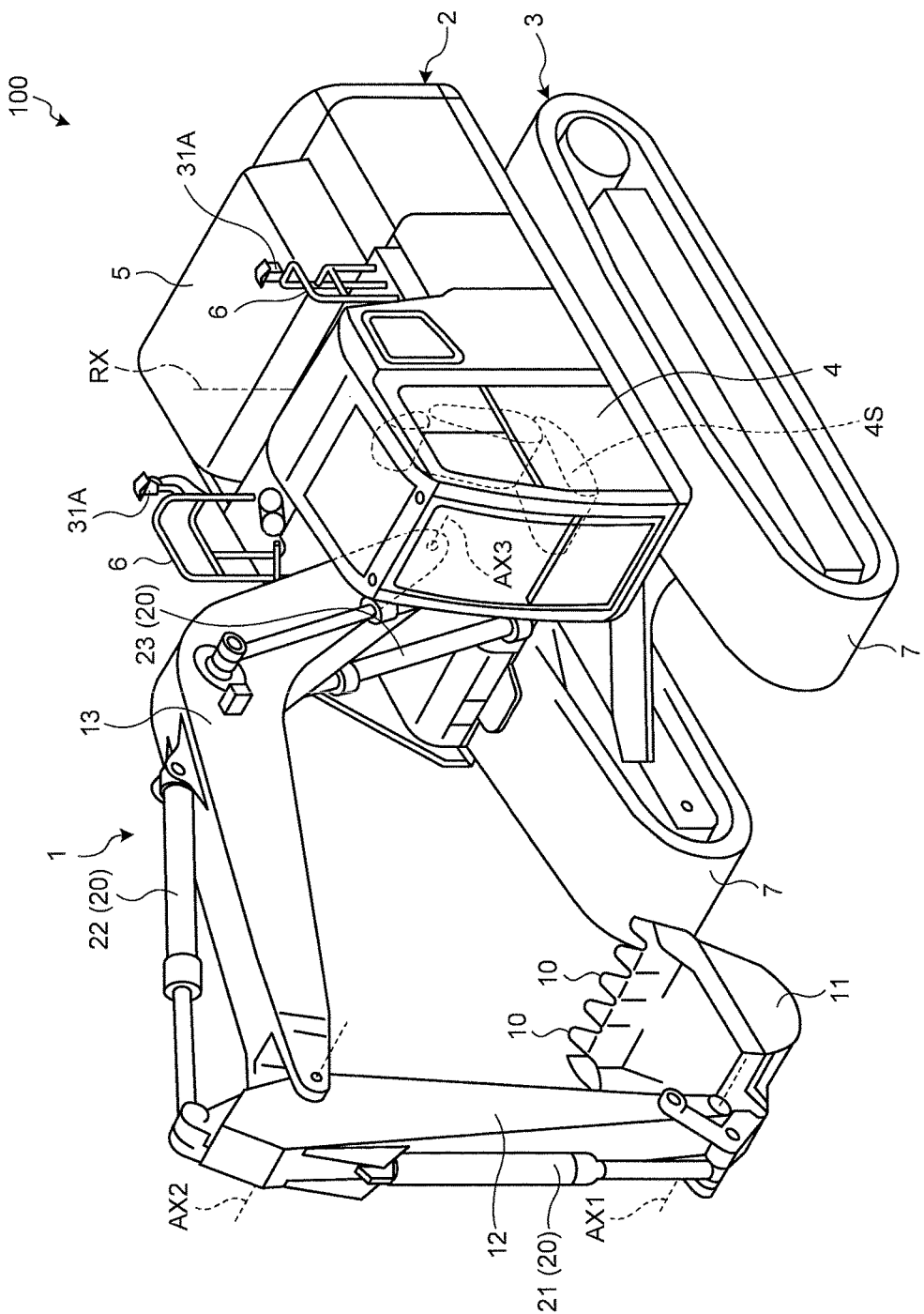
FIG. 1 is a perspective view illustrating an example of a construction machine according to a first embodiment.

A first embodiment will be described. FIG. 1 is a perspective view illustrating an example of a construction machine 100 according to the embodiment. In the embodiment, an example will be described in which the construction machine 100 is the excavator 100.

As illustrated in FIG. 1, the excavator 100 includes a work machine 1 which is operated by a hydraulic pressure, a vehicle body 2 which supports the work machine 1, and a travel device 3 which supports the vehicle body 2. The vehicle body 2 is able to swing about a swing axis RX while being supported by the travel device 3. The vehicle body 2 is disposed on the travel device 3. In the description below, the vehicle body 2 will be appropriately referred to as the upper swing body 2, and the travel device 3 will be appropriately referred to as the lower travel body 3.

The upper swing body 2 includes a cab 4 which is occupied by an operator, a machine room 5 which accommodates an engine or a hydraulic pump, and a handrail 6. The cab 4 includes a driver seat 4S on which the operator sits. The machine room 5 is disposed in rear of the cab 4. The handrail 6 is disposed in front of the machine room 5.

The lower travel body 3 includes a pair of crawlers 7. By the rotation of the crawlers 7, the excavator 100 travels. In addition, the lower travel body 3 may be vehicle wheels (tires).

The work machine 1 is supported by the upper swing body 2. The work machine 1 includes a bucket 11 having a blade tip 10, an arm 12 connected to the bucket 11, and a boom 13 connected to the arm 12. The bucket 11 is a working member including the blade tip 10. The arm 12 and the boom 13 are connection members that connect the bucket 11 and the upper swing body 2 to each other.

The blade tip 10 of the bucket 11 may be a tip of a convex blade provided in the bucket 11. The blade tip 10 of the bucket 11 may be a tip of a straight blade provided in the bucket 11.

The bucket 11 and the arm 12 are connected to each other through a bucket pin. The bucket 11 is supported by the arm 12 so as to be rotatable about a rotation axis AX1. The arm 12 and the boom 13 are connected to each other through an arm pin. The arm 12 is supported by the boom 13 so as to be rotatable about a rotation axis AX2. The boom 13 and the vehicle body 2 are connected to each other through a boom pin. The boom 13 is supported by the vehicle body 2 so as to be rotatable about a rotation axis AX3.

The rotation axis AX1, the rotation axis AX2, and the rotation axis AX3 are parallel to one another. The rotation axes AX1, AX2, and AX3 and the swing axis RX are perpendicular to one another within a space. In the description below, the axial direction of each of the rotation axes AX1, AX2, and AX3 will be appropriately referred to as the vehicle width direction of the upper swing body 2, and the direction perpendicular to the rotation axes AX1, AX2, and AX3 and the swing axis RX will be appropriately referred to as the front/back direction of the upper swing body 2.

Figure 2:
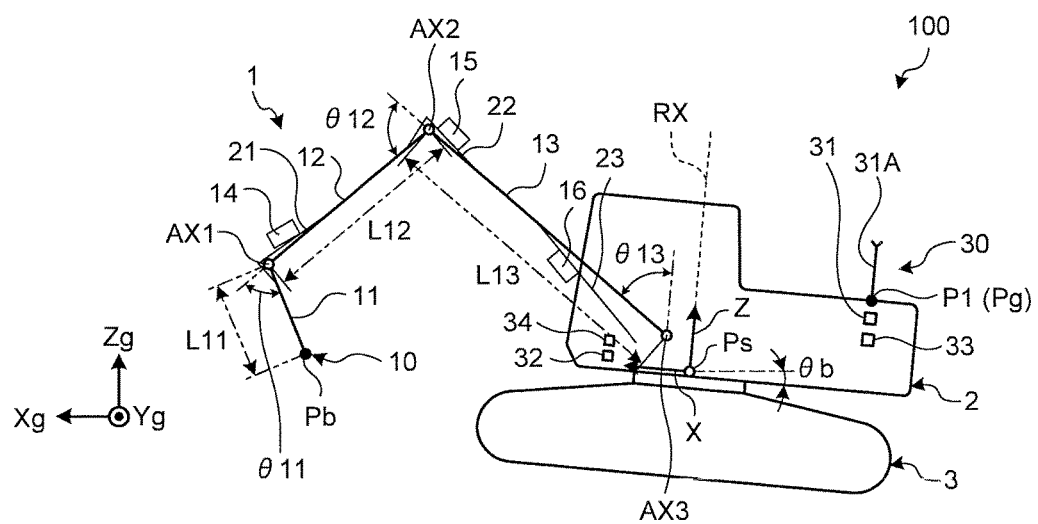
FIG. 2 is a schematic side view illustrating an example of the construction machine according to the first embodiment.
Figure 3:
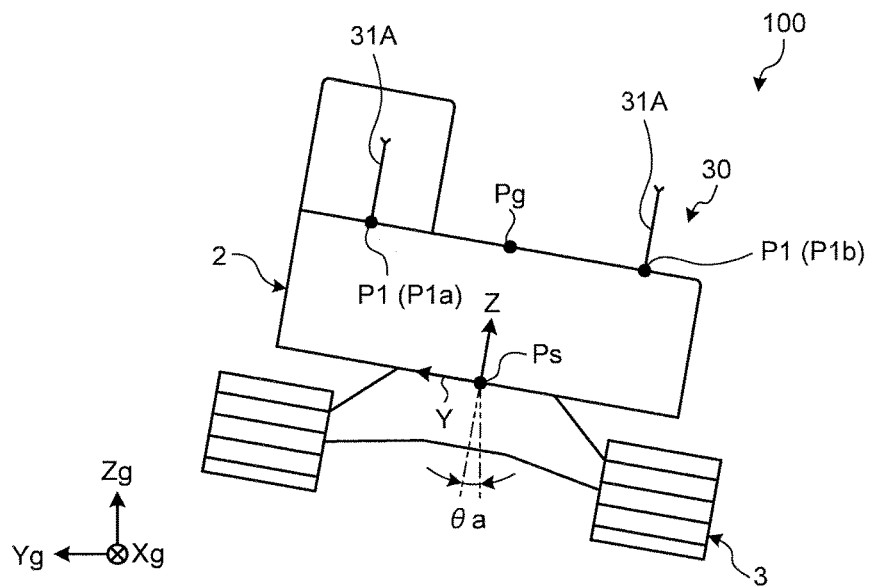
FIG. 3 is a schematic rear view illustrating an example of the construction machine according to the first embodiment.

FIG. 2 is a schematic side view illustrating the excavator 100 according to the embodiment. FIG. 3 is a schematic rear view illustrating the excavator 100 according to the embodiment.

As illustrated in FIGS. 1 and 2, the excavator 100 includes a hydraulic cylinder 20 which drives the work machine 1. The hydraulic cylinder 20 is driven by hydraulic oil. The hydraulic cylinder 20 includes a bucket cylinder 21 which drives the bucket 11, an arm cylinder 22 which drives the arm 12, and a boom cylinder 23 which drives the boom 13.

As illustrated in FIG. 2, the excavator 100 includes a bucket cylinder stroke sensor 14 which is disposed in the bucket cylinder 21, an arm cylinder stroke sensor 15 which is disposed in the arm cylinder 22, and a boom cylinder stroke sensor 16 which is disposed in the boom cylinder 23. The bucket cylinder stroke sensor 14 detects a bucket cylinder length as the stroke length of the bucket cylinder 21. The arm cylinder stroke sensor 15 detects an arm cylinder length as the stroke length of the arm cylinder 22. The boom cylinder stroke sensor 16 detects a boom cylinder length as the stroke length of the boom cylinder 23.

As illustrated in FIGS. 2 and 3, the excavator 100 includes a position detector 30 which detects the position of the upper swing body 2. The position detector 30 includes a vehicle body position sensor 31 which detects the position of the upper swing body 2 defined by a global coordinate system, a posture detection sensor 32 which detects the posture of the upper swing body 2, and a direction sensor 33 which detects the direction of the upper swing body 2. In addition, the direction sensor 33 may be provided separately from the position detector 30.

The global coordinate system (the XgYgZg coordinate system) is a coordinate system that indicates an absolute position defined by a GPS (Global Positioning System). The position detector 30 detects the three-dimensional position of the upper swing body 2 defined by the global coordinate system, the inclination angle of the upper swing body 2 with respect to the horizontal plane, and the direction of the upper swing body 2 with respect to the reference direction.

The vehicle body position sensor 31 includes a GPS receiver. The vehicle body position sensor 31 detects the three-dimensional position of the upper swing body 2 defined by the global coordinate system. The vehicle body position sensor 31 detects the Xg-direction position, the Yg-direction position, and the Zg-direction position of the upper swing body 2.

The upper swing body 2 is provided with a GPS antenna 31A. The GPS antenna 31A is provided in the handrail 6 of the upper swing body 2. In addition, the GPS antenna 31A may be disposed on a counterweight disposed in rear of the machine room 5. The GPS antenna 31A receives a radio wave from a GPS satellite and outputs a signal to the vehicle body position sensor 31 based on the received radio wave. The vehicle body position sensor 31 detects the installation position P1 of the GPS antenna 31A defined by the global coordinate system based on the signal supplied from the GPS antenna 31A. The vehicle body position sensor 31 detects the absolute position Pg of the upper swing body 2 based on the installation position P1 of the GPS antenna 31A.

The GPS antenna 31A is provided at two positions in the vehicle width direction. The vehicle body position sensor 31 detects each of the installation position P1a of one GPS antenna 31A and the installation position P1b of the other GPS antenna 31A. In the embodiment, the vehicle body position sensor 31 is provided at one position, but may be provided in each GPS antenna 31A. The vehicle body position sensor 31A detects the absolute position Pg of the upper swing body 2 by performing a calculation process based on the installation position P1a and the installation position P1b. In the embodiment, the absolute position Pg of the upper swing body 2 is located between the installation position P1a and the installation position P1b. In addition, the absolute position Pg of the upper swing body 2 may be located in any one of the installation position P1a and the installation position P1b.

The posture detection sensor 32 includes an IMU (Inertial Measurement Unit). The posture detection sensor 32 is provided in the upper swing body 2. The posture detection sensor 32 is disposed at the lower part of the cab 4. The posture detection sensor 32 detects a posture as the inclination angle of the upper swing body 2 with respect to the horizontal plane (the XgYg plane). The inclination angle of the upper swing body 2 with respect to the horizontal plane includes the inclination angle θa of the upper swing body 2 with respect to the vehicle width direction and the inclination angle θb of the upper swing body 2 with respect to the front/back direction.

The direction sensor 33 has a function of detecting the direction of the upper swing body 2 with respect to the reference direction defined by the global coordinate system based on the installation position P1a of one GPS antenna 31A and the installation position P1b of the other GPS antenna 31A. The reference direction is, for example, a north. The direction sensor 33 detects the direction of the upper swing body 2 with respect to the reference direction by performing a calculation process based on the installation position P1a and the installation position P1b. The direction sensor 33 calculates a line connecting the installation position P1a and the installation position P1b and detects the direction of the upper swing body 2 with respect to the reference direction based on an angle formed between the calculated line and the reference direction. In addition, the direction sensor 33 may be configured as a direction sensor which detects a direction by a method (for example, a method of using a magnetic sensor) different from the above-described method while being separated from the position detector 30.

The excavator 100 includes a blade tip position sensor 34 which detects the relative position of the blade tip 10 with respect to the upper swing body 2. The blade tip position sensor 34 detects the position of the blade tip 10 of the work machine 1 with respect to the upper swing body 2 defined by a local coordinate system.

The local coordinate system (the XYZ coordinate system) is a coordinate system that indicates a relative position based on the upper swing body 2 of the excavator 100.

The blade tip position sensor 34 of the embodiment is used to detect the relative position of the blade tip 10 with respect to the upper swing body 2 based on the detection result of the bucket cylinder stroke sensor 14, the detection result of the arm cylinder stroke sensor 15, the detection result of the boom cylinder stroke sensor 16, the length L11 of the bucket 11, the length L12 of the arm 12, and the length L13 of the boom 13.

The blade tip position sensor 34 calculates the inclination angle θ11 of the blade tip 10 of the bucket 11 with respect to the arm 12 based on the bucket cylinder length detected by the bucket cylinder stroke sensor 14. The blade tip position sensor 34 detects the inclination angle θ12 of the arm 12 with respect to the boom 13 based on the arm cylinder length detected by the arm cylinder stroke sensor 15. The blade tip position sensor 34 calculates the inclination angle θ13 of the boom 13 with respect to the upper swing body 2 based on the boom cylinder length detected by the boom cylinder stroke sensor 16. In addition, the blade tip position sensor 34 may be an angle sensor using a potentiometer, and the angle sensor may detect the inclination angle θ11 of the bucket 11, the inclination angle θ12 of the arm 12, and the inclination angle θ13 of the boom 13.

The length L11 of the bucket 11 is a distance between the blade tip 10 of the bucket 11 and the rotation axis AX1 (the bucket pin). The length L12 of the arm 12 is a distance between the rotation axis AX1 (the bucket pin) and the rotation axis AX2 (the arm pin). The length L13 of the boom 13 is a distance between the rotation axis AX2 (the arm pin) and the rotation axis AX3 (the boom pin).

The blade tip position sensor 34 detects the relative position of the blade tip 10 with respect to the rotation axis AX3 of the upper swing body 2 based on the inclination angle θ11, the inclination angle θ12, the inclination angle θ13, the length L11, the length L12, and the length L13.

Further, the blade tip position sensor 34 detects the absolute position Pb of the blade tip 10 based on the absolute position Pg of the upper swing body 2 detected by the position detector 30 and the relative position between the rotation axis AX3 of the upper swing body 2 and the blade tip 10. The relative position between the absolute position Pg and the rotation axis AX3 is given data derived from the resource data of the excavator 100. Accordingly, the blade tip position sensor 34 is able to detect the absolute position Pb of the blade tip 10 based on the absolute position Pg of the upper swing body 2, the relative position between the rotation axis AX3 of the upper swing body 2 and the blade tip 10, and the resource data of the excavator 100.

Figure 4:
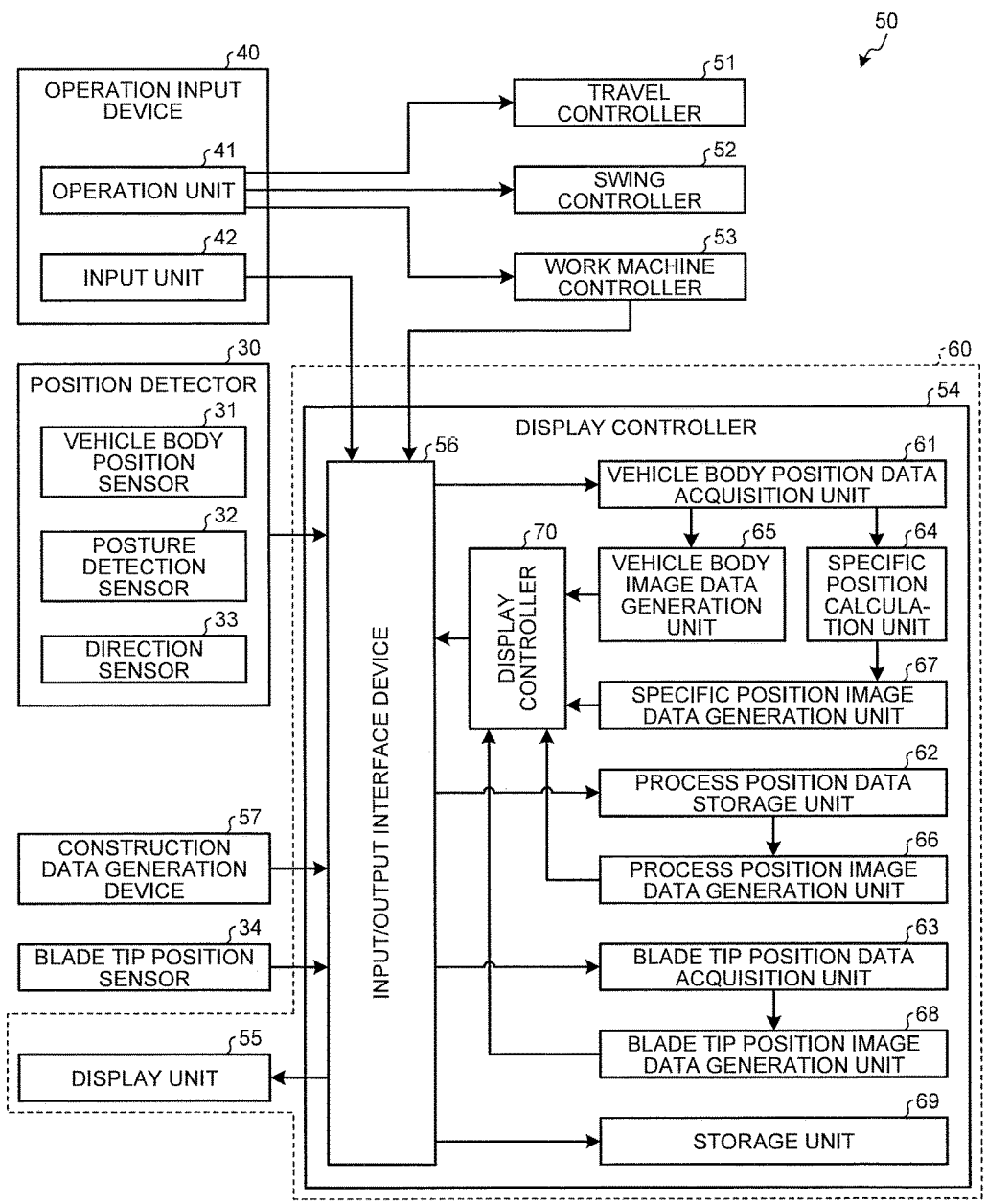
FIG. 4 is a functional block diagram illustrating an example of the construction machine according to the first embodiment.

Next, a controller 50 and a display system 60 of the excavator 100 according to the embodiment will be described. FIG. 4 is a functional block diagram illustrating an example of the excavator 100 according to the embodiment. As illustrated in FIG. 4, the excavator 100 includes an operation input device 40 which is operated by the operator of the excavator 100, the controller 50 which controls the excavator 100, and the display system 60.

The controller 50 includes a travel controller 51 which controls the lower travel body 3, a swing controller 52 which controls the swinging of the upper swing body 2, a work machine controller 53 which controls the work machine 1, and a display controller 54 which controls the display system 60.

The operation input device 40 is disposed in the cab 4. The operation input device 40 includes an operation unit 41 which generates an operation signal for operating the lower travel body 3, the upper swing body 2, and the work machine 1 and an input unit 42 which generates an input signal for operating the display system 60.

The operation unit 41 includes a travel operation member, a swing operation member, and a work machine operation member operated by the operator. Each of the travel operation member, the swing operation member, and the work machine operation member includes a joystick or an operation lever. By the operation of the travel operation member, a travel operation signal for operating the lower travel body 3 is output from the operation unit 41. By the operation of the swing operation member, a swing operation signal for operating the upper swing body 2 is output from the operation unit 41. By the operation of the work machine operation member, a work machine operation signal for operating the work machine 1 is output from the operation unit 41. The travel operation signal is output to the travel controller 51. The swing control signal is output to the swing controller 52. The work machine operation signal is output to the work machine controller 53.

The travel controller 51 controls a hydraulic motor for driving the crawler 7. The travel controller 51 drives the crawler 7 based on the travel operation signal. The swing controller 52 controls the hydraulic motor for swinging the upper swing body 2. The swing controller 52 swings the upper swing body 2 based on the swing operation signal. The work machine controller 53 controls the hydraulic cylinder 20 for driving the work machine 1. The work machine controller 53 drives the work machine 1 based on the work machine operation signal.

The input unit 42 includes an input device such as an input button, a keyboard, and a touch panel operated by the operator. By the operation of the input unit 42, the input signal for operating the display system 60 is output from the input unit 42. The input signal is output to the display controller 54.

The display system 60 includes the display controller 54 and a display unit 55 which has a display screen for displaying an image thereon. The display unit 55 includes a flat panel display such as a liquid crystal display or an organic electroluminescent display. The display unit 55 is disposed in, for example, the cab 4. The operator is able to operate the operation input device 40 while seeing the display screen of the display unit 55. In addition, as will be described below, at least the display unit 55 or the operation input device 40 may be provided at a remote place distant from the excavator 100 when the excavator 100 is remotely operated.

The display controller 54 includes a computer system. The display controller 54 includes a processor such as a CPU (Central Processing Unit), a storage device such as a ROM (Read Only Memory) or a RAM (Random Access Memory), and an input/output interface device 56 (an input/output unit).

In the description below, the absolute position Pg will be appropriately described as the current position Pg. The display controller 54 includes a vehicle body position data acquisition unit 61 which acquires vehicle body position data indicating the current position Pg of the upper swing body 2 supporting the work machine 1, a process position data storage unit 62 which stores process position data indicating the process position Pc of the process target processed by the work machine 1, a blade tip position data acquisition unit 63 which acquires blade tip position data indicating the current position Pb of the blade tip 10, and a specific position calculation unit 64 which calculates specific position data indicating the specific position Ps based on the vehicle body position data.

Further, the display controller 54 includes a vehicle body image data generation unit 65 which generates vehicle body image data including a top view image 2G indicating the upper swing body 2 and the lower travel body 3 based on the vehicle body position data, a process position image data generation unit 66 which generates process position image data including an image 200 indicating the process position Pc based on the process position data, a specific position image data generation unit 67 which generates specific position image data including an image 300 indicating the specific position Ps based on the specific position data, and a blade tip position image data generation unit 68 which generates blade tip position image data including an image 400 indicating the blade tip 10 based on the blade tip position data.

Further, the display controller 54 includes a display controller 70 which controls an image displayed on the display screen of the display unit 55.

Further, the display controller 54 includes a storage unit 69 which stores various data. In the embodiment, the storage unit 69 stores the resource data of at least the work machine 1 (the bucket 11, the arm 12, and the boom 13), the upper swing body 2, or the travel device 3 of the excavator 100.

The processor of the display controller 54 includes the vehicle position data acquisition unit 61, the process position data storage unit 62, the blade tip position data acquisition unit 63, the specific position calculation unit 64, the vehicle body image data generation unit 65, the process position image data generation unit 66, the specific position image data generation unit 67, the blade tip position image data generation unit 68, and the display controller 70. The storage device of the display controller 54 includes the storage unit 69.

The vehicle body position data acquisition unit 61 acquires the vehicle body position data indicating the current position Pg of the upper swing body 2 supporting the work machine 1 from the position detector 30 through the input/output interface device 56. The current position Pg is a current absolute position defined by the global coordinate system. The vehicle body position sensor 31 detects the current position Pg of the upper swing body 2 based on the installation position P1*a* and the installation position P1*b* of the GPS antenna 31. The vehicle body position data acquisition unit 61 acquires the vehicle body position data indicating the current position Pg of the upper swing body 2 from the vehicle body position sensor 31.

The process position data storage unit 62 acquires the process position data indicating the process position Pc of the process target processed by the work machine 1 from a construction data generation device 57 through the input/output interface device 56 and stores the process position data. The process position Pc is an absolute position defined by the global coordinate system. The construction data generation device 57 is an external device provided outside the excavator 100. The process target indicates a target such as a ground surface constructed by the work machine 1. The construction of the work machine 1 includes at least one of excavating, soil cutting, soil pressing, banking, rolling, and leveling of the work machine 1. In addition, the process target may be a building.

The construction data generation device 57 is provided in, for example, a remote place separated from the excavator 100. The construction data generation device 57 is provided in a construction company. The construction data generation device 57 includes a computer system. The construction data generation device 57 generates design topography data indicating the design topography as the target shape of the construction area. The design topography data indicates a two-dimensional or three-dimensional target shape obtained after the construction of the work machine 1. The process position data indicating the process position Pc is data indicating the process position Pc constructed by the work machine 1 in the design topography data. The input/output interface device 56 includes a radio communication device and is able to perform a radio communication with the construction data generation device 57 and the display controller 54. The design topography data including the process position data generated by the construction data generation device 57 is wirelessly transmitted to the display controller 54. In addition, the construction data generation device 57 and the input/output interface device 56 may be connected to each other through a wire so that the design topography data is transmitted from the construction data generation device 57 to the input/output interface device 56. Further, the construction data generation device 57 may be a reading device which includes a storage medium storing the design topography data and in which the input/output interface device 56 is able to read the design topography data from the storage medium. The process position data storage unit 62 acquires the process position data indicating the process position Pc from the construction data generation device 57.

The blade tip position data acquisition unit 63 acquires the blade tip position data indicating the current position Pb of the blade tip 10 from the blade tip position sensor 34 through the input/output interface device 56. The current position Pb is a current absolute position defined by the global coordinate system. The blade tip position sensor 34 detects the current position Pb of the blade tip 10 based on the absolute position Pg of the upper swing body 2, the relative position between the rotation axis AX3 of the upper swing body 2 and the blade tip 10, and the resource data of the excavator 100. The blade tip position data acquisition unit 63 acquires the blade tip position data indicating the current position Pb of the blade tip 10 from the blade tip position sensor 34.

The specific position calculation unit 64 calculates the specific position data indicating the specific position Ps in which the relative position with respect to the current position Pg of the upper swing body 2 is fixed based on the vehicle body position data acquired by the vehicle body position data acquisition unit 61. The specific position Ps is an absolute position defined by the global coordinate system. As illustrated in FIGS. 2 and 3, in the embodiment, for example, the specific position Ps includes any one position on the swing axis RX of the upper swing body 2. In the embodiment, the specific position Ps is set by the intersection point between the swing axis RX and the lower surface of the upper swing body 2. Since the specific position data is calculated sequentially, it is possible to obtain the accurate specific position Ps that matches the motion or the posture of the excavator 100.

The current position Pg is determined based on, for example, the installation position P1 of the GPS antenna 31, but the invention is not limited thereto. The specific position Ps is determined based on, for example, the swing axis RX of the upper swing body 2, but the invention is not limited thereto.

The current position Pg and the specific position Ps are separated from each other. The relative position between the current position Pg and the specific position Ps is fixed. The relative position between the current position Pg and the specific position Ps is given data derived from the resource data of the excavator 100. The specific position calculation unit 64 calculates the specific position Ps defined by the global coordinate system based on the current position Pg acquired by the vehicle body position data acquisition unit 61 and the resource data of the excavator 100.

The vehicle body image data generation unit 65 generates vehicle body image data including the top view image 2G (hereinafter, appropriately referred to as the top view image 2G of the upper swing body 2) indicating the upper swing body 2 and the lower travel body 3 based on the vehicle body position data acquired by the vehicle body position data acquisition unit 61. The vehicle body image data generation unit 65 generates the graphic data (the top view image) of the upper swing body 2 in the top view. The size and the design of the excavator 100 are given data. The vehicle body image data generation unit 65 generates the top view image 2G of the upper swing body 2 so that the top view image 2G of the upper swing body 2 is disposed at the current position Pg of the upper swing body 2 based on the vehicle body position data. In addition, the vehicle body image data or the blade tip position image data can be generated as below. In a top view image 100G indicating the excavator 100 including the top view image 2G of the upper swing body 2 and a top view image 1G of the work machine 1, for example, the three-dimensional model data of the wire frame is stored in a predetermined storage unit in advance based on the resource data as the design dimension of the upper swing body 2 or the work machine 1 (including the bucket 11) of the excavator 100. Here, the vehicle body image data generation unit 65 or the blade tip position image data generation unit 68 can generate the top view image 100G by using the three-dimensional model data based on the vehicle body position data acquired by the vehicle body position data acquisition unit 61 and the blade tip position data acquired by the blade tip position data acquisition unit 63. In addition, the vehicle body image data or the blade tip position image data may be stored in advance as graphic data including an index mark 300 or an index mark 400 in a predetermined storage unit so that the display position of the graphic data is displayed while being changed based on the vehicle body position data or the blade tip position data. In this case, the display controller 54 displays the graphic data including the index mark 300 on the display screen of the display unit 55 based on the relative positional relation between the vehicle body position data and the process position data without sequentially calculating the specific position Ps by the specific position calculation unit 64.

The process position image data generation unit 66 generates the process position image data including the image 200 indicating the process position Pc of the process target based on the process position data acquired by the process position data storage unit 62. The process position image data generation unit 66 generates the graphic data (the top view image) indicating the process target in the top view and the graphic data (the top view image) indicating the process position Pc in the top view. The process position Pc is an absolute position defined by the global coordinate system. The process position image data generation unit 66 generates the image 200 indicating the process position Pc based on the process position data. In the embodiment, in the embodiment, the image 200 indicating the process position Pc includes a guide line 200 displayed so as to be superimposed on the process position Pc.

The specific position image data generation unit 67 generates the specific position image data including the image 300 indicating the specific position Ps based on the specific position data calculated by the specific position calculation unit 64. The specific position image data generation unit 67 generates the graphic data indicating the specific position Ps in the top view. As described above, the specific position Ps is an absolute position defined by the global coordinate system. The specific position image data generation unit 67 generates the top view image of the specific position Ps based on the specific position data. In the embodiment, the image 300 indicating the specific position Ps includes the index mark 300 displayed so as to be superimposed on the specific position Ps.

The blade tip position image data generation unit 68 generates the blade tip position image data including an image indicating the blade tip 10 and the image 400 indicating the current position Pb of the blade tip 10 based on the blade tip position data acquired by the blade tip position data acquisition unit 63. The blade tip position image data generation unit 68 generates the graphic data (the top view image) indicating the blade tip 10 in the top view and the graphic data (the top view image) indicating the current position Pb of the blade tip 10 in the top view. The current position Pb of the blade tip 10 is an absolute position defined by the global coordinate system. The blade tip position image data generation unit 68 generates an image indicating the blade tip 10 and the image 400 indicating the current position Pb of the blade tip 10 based on the blade tip position data. In the embodiment, the image 400 indicating the current position Pb of the blade tip 10 includes the index mark 400 displayed so as to be superimposed on the blade tip 10.

Further, the blade tip position image data generation unit 68 also generates the graphic data (the top view image) indicating the work machine 1 including the bucket 11, the arm 12, and the boom 13 as well as the graphic data of the blade tip 10. That is, the top view image 1000 indicating the excavator 100 including the top view image 2G of the upper swing body 2 and the top view image 1G of the work machine 1 is generated by the vehicle body image data generation unit 65 and the blade tip position image data generation unit 68. The top view image 1G includes the image of the bucket 11, and the image of the bucket 11 changes in response to the motion of the bucket 11 and the viewing direction of the bucket 11 in the top view. Further, in the top view image 1G, the image of the work machine 1 changes in response to the motion of the work machine 1 and the viewing direction of the work machine 1 in the top view.

The display controller 70 controls an image displayed on the display screen of the display unit 55. The display controller 70 displays the image 200 indicating the process position Pc and the image 300 indicating the specific position Ps on the display unit 55 based on the process position data and the specific position data.

Further, the display controller 70 displays the top view image 2G indicating the upper swing body 2 on the display screen of the display unit 55 along with the image 200 indicating the process position Pc and the image 300 indicating the specific position Ps. Further, the display controller 70 displays the top view image 2G indicating the upper swing body 2 and the image 300 indicating the specific position Ps on the display screen of the display unit 55 in a superimposed state.

Further, the display controller 70 displays the image 400 indicating the current position Pb of the blade tip 10 on the display screen of the display unit 55 along with the image 200 indicating the process position Pc and the image 300 indicating the specific position Ps.

Figure 5:
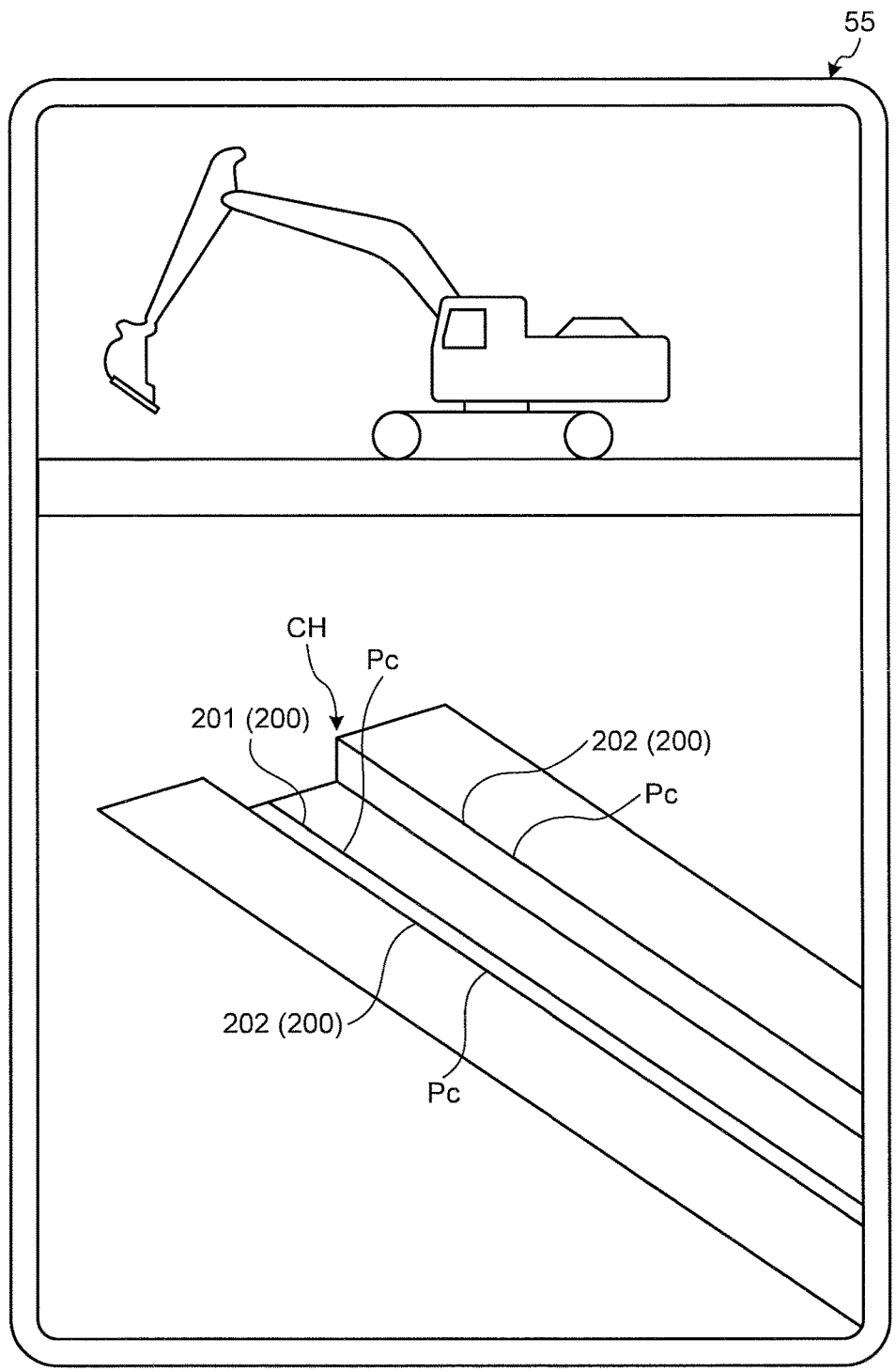
FIG. 5 is a diagram illustrating an example of a display system according to the first embodiment.

Next, according to the embodiment, a display example of an image by the display unit 55 of the display system 60 will be described. FIG. 5 is a diagram illustrating an example of the display screen of the display unit 55 according to the embodiment. In the description below, an example will be described in which a computer aided construction is performed on the construction area (the process target) by the excavator 100. The computer aided construction is a system that realizes a high-efficient and high-precise construction based on an ICT (Information and Communication Technology) by focusing on a construction among construction steps including an investigation, a design, a construction, a supervision, an inspection, and a management and using electronic information obtained from the steps. Further, since the electronic information obtained by the construction is used in the other steps, it is possible to improve the productivity and ensure the quality in the entire construction steps. The excavator 100 can perform the computer aided construction and automatically control the motion of the work machine 1. The excavator 100 constructs the current topography as the target topography by the work machine 1 based on the design topography data indicating the target topography of the construction area and supplied from the construction data generation device 57. The process target includes the topography to be constructed as the target topography or the topography constructed in a predetermined step of the target topography.

In the description below, it is assumed that the target topography is a channel CH formed on a ground surface. That is, the process target of the work machine 1 is the channel CH formed on the ground surface, and the process position Pc is the position of the channel CH. The channel CH extends in a predetermined direction with a specific width and a specific depth. In the channel CH constructed by the work machine 1, the process position Pc includes at least the center position of the channel CH in the width direction and both end positions of the channel CH in the width direction.

The process position image data generation unit 66 generates the process position image data including the image 200 indicating the process position Pc based on the process position data. As illustrated in FIG. 5, the display controller 70 displays the graphic data indicating the excavator 100 in the side view on the display unit 55 based on the resource data of the excavator 100. Further, the display controller 70 displays the three-dimensional image of the design topography data indicating the channel CH as the target topography on the display unit 55.

The process position Pc constructed by the work machine 1 includes the center of the channel CH in the width direction and both ends of the channel CH in the width direction. The process position image data generation unit 66 generates an image 201 indicating the center of the channel CH in the width direction and an image 202 indicating both ends of the channel CH based on the process position data. As illustrated in FIG. 5, the image 200 indicating the process position Pc includes the guide line 200 displayed so as to be superimposed on the process position Pc. The guide line 200 is disposed so as to be superimposed on at least a part of the channel CH as the process position Pc. The guide line 200 includes a center guide line 201 displayed so as to be superimposed on the center of the channel CH and an edge guide line 202 displayed so as to be superimposed on both ends of the channel CH (both upper ends of the channel CH) in the width direction at the bottom of the channel CH. In addition, in the image 200 indicating the process position Pc, the bottom or both ends of the channel CH may be displayed in different colors instead of lines.

Figure 6:
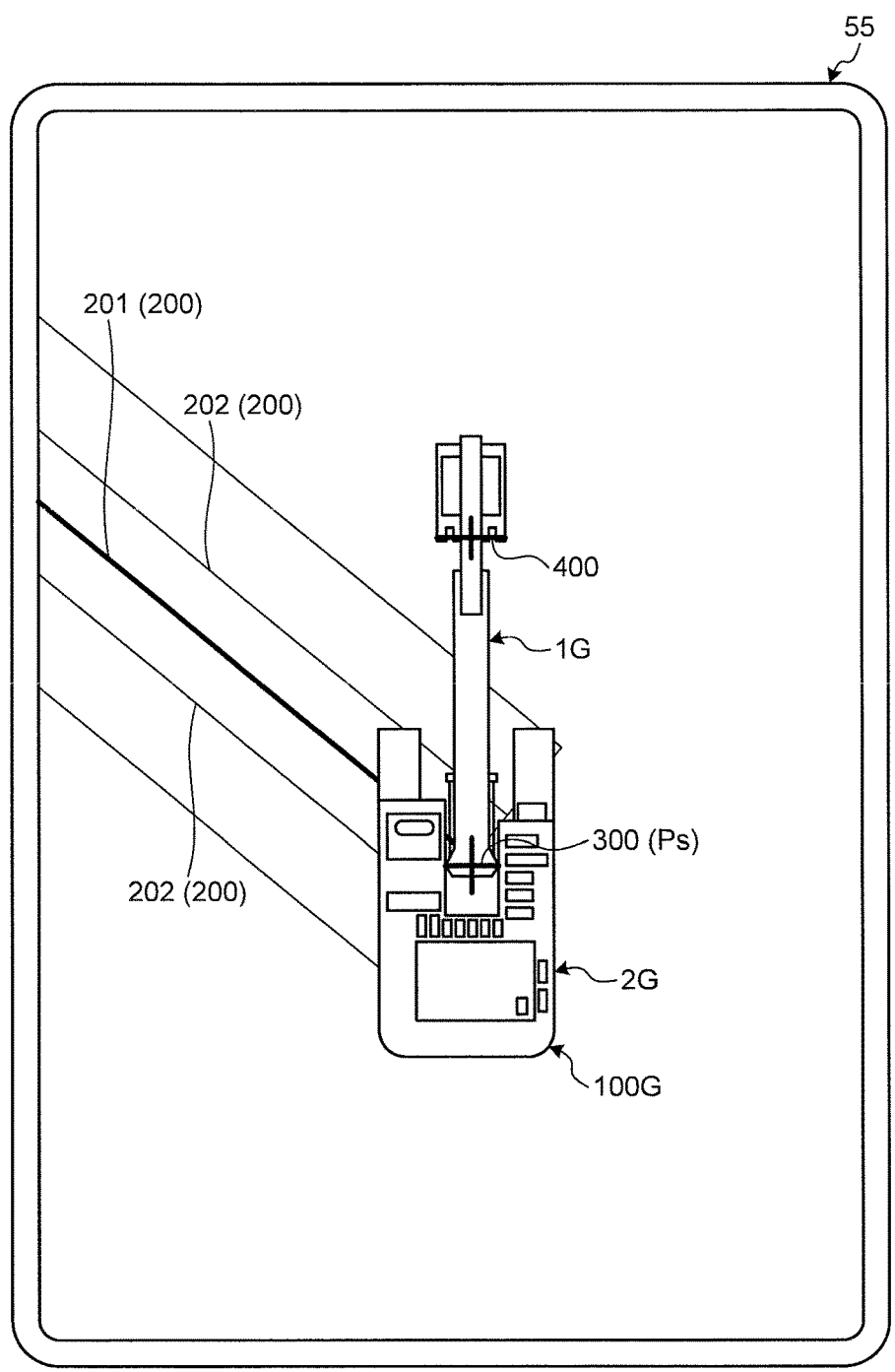
FIG. 6 is a diagram illustrating an example of the display system according to the first embodiment.

FIG. 6 is a diagram illustrating an example of the display screen of the display unit 55. The specific position image data generation unit 67 generates the specific position image data including the image 300 indicating the specific position Ps based on the specific position data. As described above, the vehicle body image data generation unit 65 generates the vehicle body image data including the top view image 2G indicating the upper swing body 2 based on the vehicle body position data and the resource data of the excavator 100.

In the embodiment, the specific position Ps is set by the swing axis RX of the upper swing body 2. As illustrated in FIG. 6, the image 300 indicating the specific position Ps includes the index mark 300 displayed so as to be superimposed on the swing axis RX as the specific position Ps. The index mark 300 is, for example, a cross mark (a cross-shaped mark).

As illustrated in FIG. 6, the display controller 70 displays both an image indicating the process position Pc including the guide line 200 and an image indicating the specific position Ps including the index mark 300 on the display screen of the display unit 55. The display controller 70 displays the index mark 300 so that the center of the index mark 300 matches the specific position Ps. The guide line 200 as an image indicating the process position Pc and the index mark 300 as an image indicating the specific position Ps indicate an absolute position defined by the global coordinate system. The operator who sees the display screen of the display unit 55 can visually recognize the relative position between the upper swing body 2 and the channel CH defined by the global coordinate system.

Further, as illustrated in FIG. 6, the display controller 70 displays the top view image 2G indicating the upper swing body 2 on the display screen of the display unit 55 along with the image 200 indicating the process position Pc and the image 300 indicating the specific position Ps. The display controller 70 displays the top view image 2G indicating the upper swing body 2 and the image 300 indicating the specific position Ps on the display screen of the display unit 55 in a superimposed state. The shape and the design of the top view image 2G are displayed in consideration of, for example, the resource data of the excavator 100. The position of the shape of the top view image 2G indicates an absolute position defined by the global coordinate system. The operator who sees the display screen of the display unit 55 can visually recognize the positional relation between the channel CH and the upper swing body 2 and the size relation between the channel CH and the upper swing body 2 as well as the relative position between the upper swing body 2 and the channel CH defined by the global coordinate system. In addition, the display controller 70 may display only the image 200 and the image 300 together on the display screen of the display unit 55. Even by such a display, the operator can visually recognize the relative position between the upper swing body 2 and the center of the channel CH in the width direction.

Further, the blade tip position image data generation unit 68 generates the blade tip position image data including the image 400 indicating the current position Pb of the blade tip 10 based on the blade tip position data. The current position Pb of the blade tip 10 includes the center of the blade tip 10 in the vehicle width direction. As illustrated in FIG. 6, the image 400 indicating the current position Pb of the blade tip 10 includes the index mark 400 displayed so as to be superimposed on the blade tip 10. The index mark 400 is, for example, a cross mark (a cross-shaped mark).

Further, the blade tip position image data generation unit 68 generates the work machine image data including the top view image 1G indicating the work machine 1 based on the blade tip position data and the resource data of the excavator 100. By the top view image 2G and the top view image 1G, the top view image 100G indicating the excavator 100 is generated.

As illustrated in FIG. 6, the display controller 70 displays an image indicating the current position Pb of the blade tip 10 including the index mark 400 on the display screen of the display unit 55 along with an image indicating the process position Pc including the guide line 200, an image indicating the specific position Ps including the index mark 300, an image indicating the upper swing body 2 including the top view image 2G, and an image indicating the work machine 1 including the top view image 1G. The display controller 70 displays the index mark 400 so that the center of the index mark 400 matches the current position Pb of the blade tip 10 (the center position of the blade tip 10 in the vehicle width direction). The index mark 400 as an image indicating the current position Pb of the blade tip 10 also indicates an absolute position defined by the global coordinate system similarly to the guide line 200 and the index mark 300. The operator who sees the display screen of the display unit 55 can visually recognize the relative position among the blade tip 10, the upper swing body 2, and the channel CH defined by the global coordinate system. In addition, the top view image 1G indicating the work machine 1, the top view image 2G indicating the upper swing body 2, and the top view image 100G indicating the excavator 100 may be displayed as, for example, an image displayed in a simple rectangular shape so that at least the shape of the work machine 1 is recognized.

Figure 7:
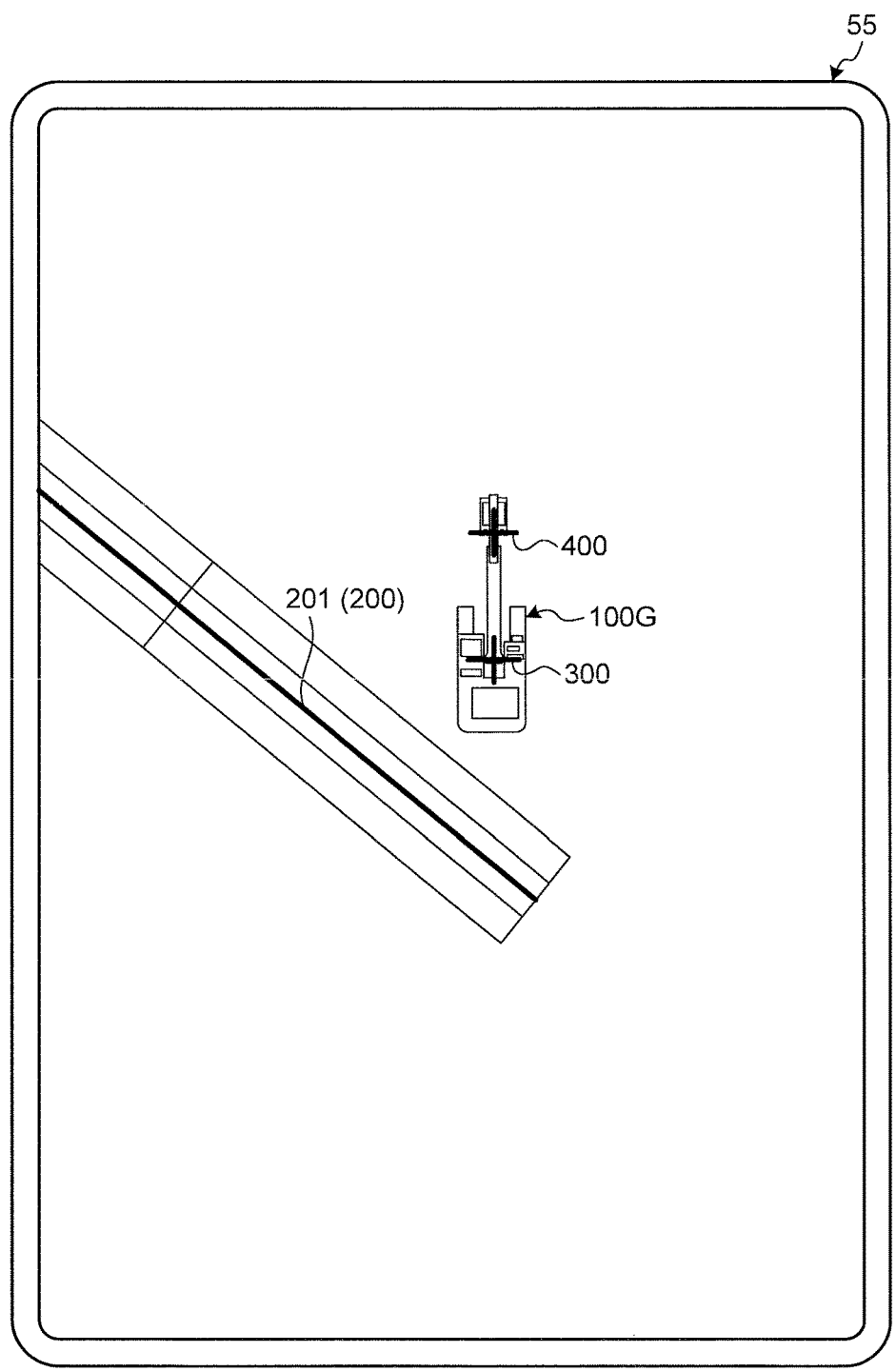
FIG. 7 is a diagram illustrating an example of the display system according to the first embodiment.

Next, a use example of the display system 60 will be described with reference to FIGS. 7, 8, and 9. As illustrated in FIG. 7, the top view image indicating the channel CH as the process target and the top view image 100G indicating the excavator 100 including the top view image 2G indicating the upper swing body 2 and the top view image 1G indicating the work machine 1 are displayed on the display screen of the display unit 55 at the same time. The top view image indicating the channel CH and the top view image 100G indicating the excavator 100 indicate an absolute position defined by the global coordinate system. The operator of the excavator 100 can visually recognize the relative position between the channel CH and the excavator 100 through the display screen of the display unit 55.

In the state illustrated in FIG. 7, the channel CH and the excavator 100 are separated from each other. In a state where the excavator is separated from the channel CH, the excavator 100 cannot construct the channel CH by using the work machine 1.

Accordingly, the operator operates the operation unit 41 so as to move the excavator 100 to the channel CH while seeing the display screen of the display unit 55 for the construction of the channel CH by the work machine 1 of the excavator 100. That is, when the excavator 100 is located at a position where the channel CH cannot be constructed just by the swinging of the upper swing body 2, the operator drives the lower travel body 3 by operating the travel operation member of the operation unit 41 while seeing the display screen of the display unit 55 so that the excavator 100 is disposed at the target position where the channel CH can be constructed by the work machine 1.

When the lower travel body 3 is driven so that the excavator 100 moves, the top view image 100G displayed on the display screen of the display unit 55 does not move and the background (the image 200) moves with the movement of the excavator 100. Here, the top view image 100G displayed on the display screen of the display unit 55 may move and the background (the image 200) may not move with the movement of the excavator 100. The vehicle body position sensor 31 of the position detector 30 continuously monitors the current position Pg of the upper swing body 2 (the excavator 100). The vehicle body position data acquisition unit 61 continuously acquires the vehicle body position data indicating the current position Pg of the upper swing body 2. Accordingly, the vehicle body image data generation unit 65 can generate the vehicle body image data for moving the top view image 100G indicating the excavator 100 on the display screen in synchronization with the movement of the upper swing body 2 based on the vehicle body position data. The display controller 70 can move the top view image 100G indicating the excavator 100 on the display screen in synchronization with the movement of the upper swing body 2.

Further, when the upper swing body 2 swings, the top view image 1G of the work machine 1 displayed on the display screen of the display unit 55 also rotates with the swinging of the upper swing body 2. The blade tip position sensor 34 of the position detector 30 continuously monitors the current position Pb of the blade tip 10. The blade tip position data acquisition unit 68 continuously acquires the blade tip position data indicating the current position Pb of the blade tip 10. Accordingly, the blade tip position image data generation unit 68 is able to generate the blade tip image data for moving or rotating the top view image 1G of the work machine 1 on the display screen in synchronization with the swinging of the upper swing body 2 or the movement of the excavator 100 based on the blade tip position data. The display controller 70 is able to move or rotate the top view image 1G of the work machine 1 on the display screen in synchronization with the swinging of the upper swing body 2 or the movement of the excavator 100.

Figure 8:
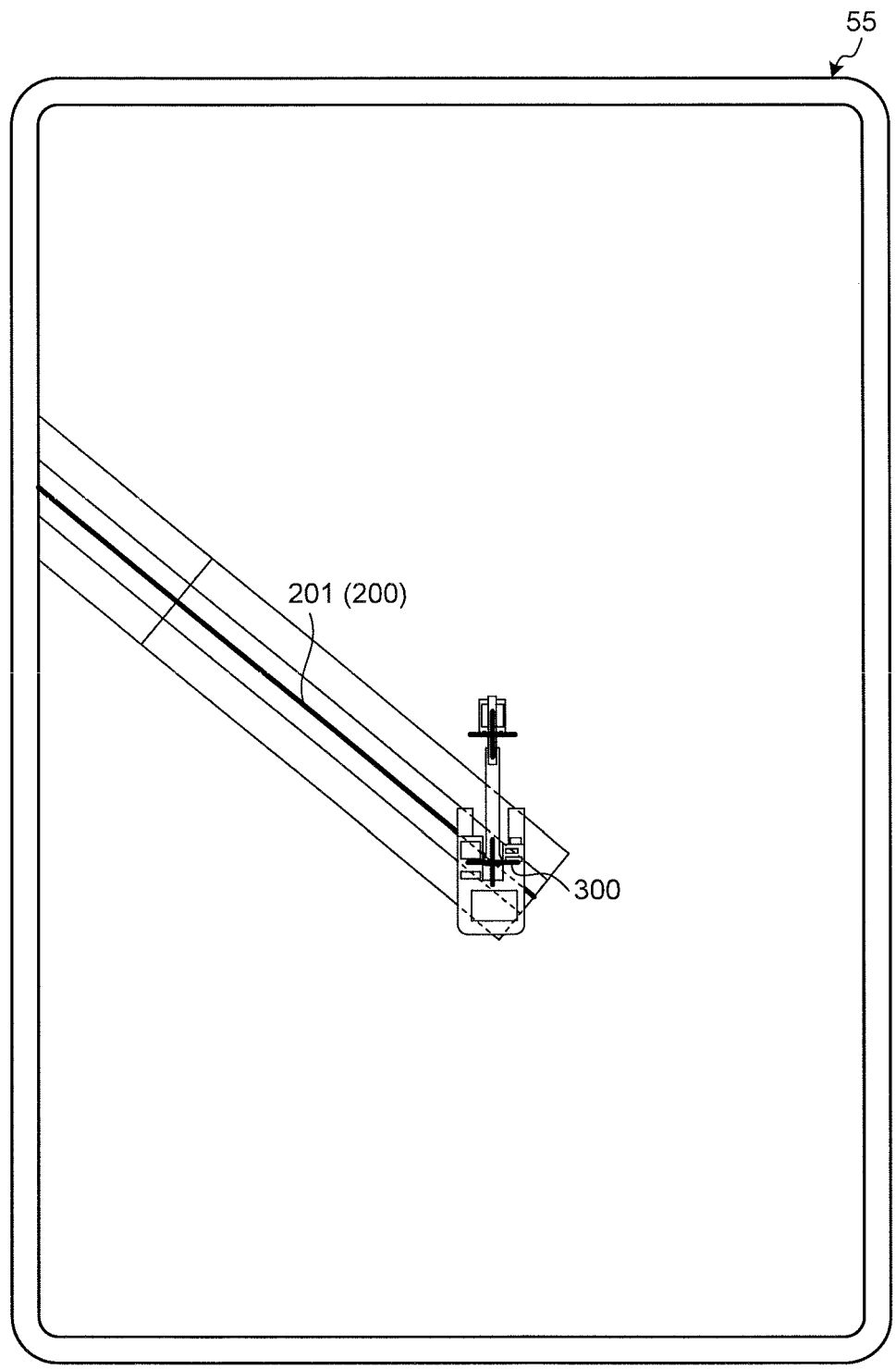
FIG. 8 is a diagram illustrating an example of the display system according to the first embodiment.

FIG. 8 is a diagram illustrating the display screen of the display unit 55 when the excavator 100 moves from a position illustrated in FIG. 7. The target position of the excavator 100 capable of forming the channel CH by the work machine 1 is the absolute position of the excavator 100 in which the center (the center guide line 201) of the channel CH matches the specific position Ps (the swing axis RX) of the upper swing body 2. The operator of the excavator 100 drives the lower travel body 3 by operating the travel operation member of the operation unit 41 so that the center guide line 201 matches the index mark 300 while seeing the display screen of the display unit 55. As described above, the operator may move the excavator 100 so that the center guide line 201 matches the center of the index mark 300, but may move the excavator 100 so that the center guide line 201 is superimposed on the lines forming the cross mark of the index mark 300.

In the embodiment, the guide line 200 as an image indicating the process position Pc and the index mark 300 as an image indicating the specific position Ps of the upper swing body 2 are displayed on the display screen of the display unit 55 at the same time. For that reason, when the excavator 100 is moved to the channel CH as the process target, the operator can smoothly perform a positioning operation between the channel CH and the excavator 100 moving to the channel CH while seeing the display screen of the display unit 55. In addition, in the embodiment, the positioning operation between the channel CH and the excavator 100 is performed by aligning the center of the bottom of the channel CH in the width direction to the swing axis RX of the excavator 100.

As illustrated in FIG. 8, the operator swings the upper swing body 2 with respect to the lower travel body 3 while stopping the driving of the lower travel body 3 by operating the swing operation member of the operation unit 41 so that the channel CH is formed by the work machine 1 after the center (for example, the intersection point of the lines forming the cross mark) of the index mark 300 indicating the swing axis RX matches the center guide line 201 indicating the center of the channel CH. Of course, when the center position of the blade tip 10 of the bucket 11 matches the position of the center guide line 201 while the center (for example, the intersection point of the lines forming the cross mark) of the index mark 300 indicating the swing axis RX matches the center guide line 201 indicating the center of the channel CH, the channel CH may be formed directly without swinging the upper swing body 2.

Figure 9:
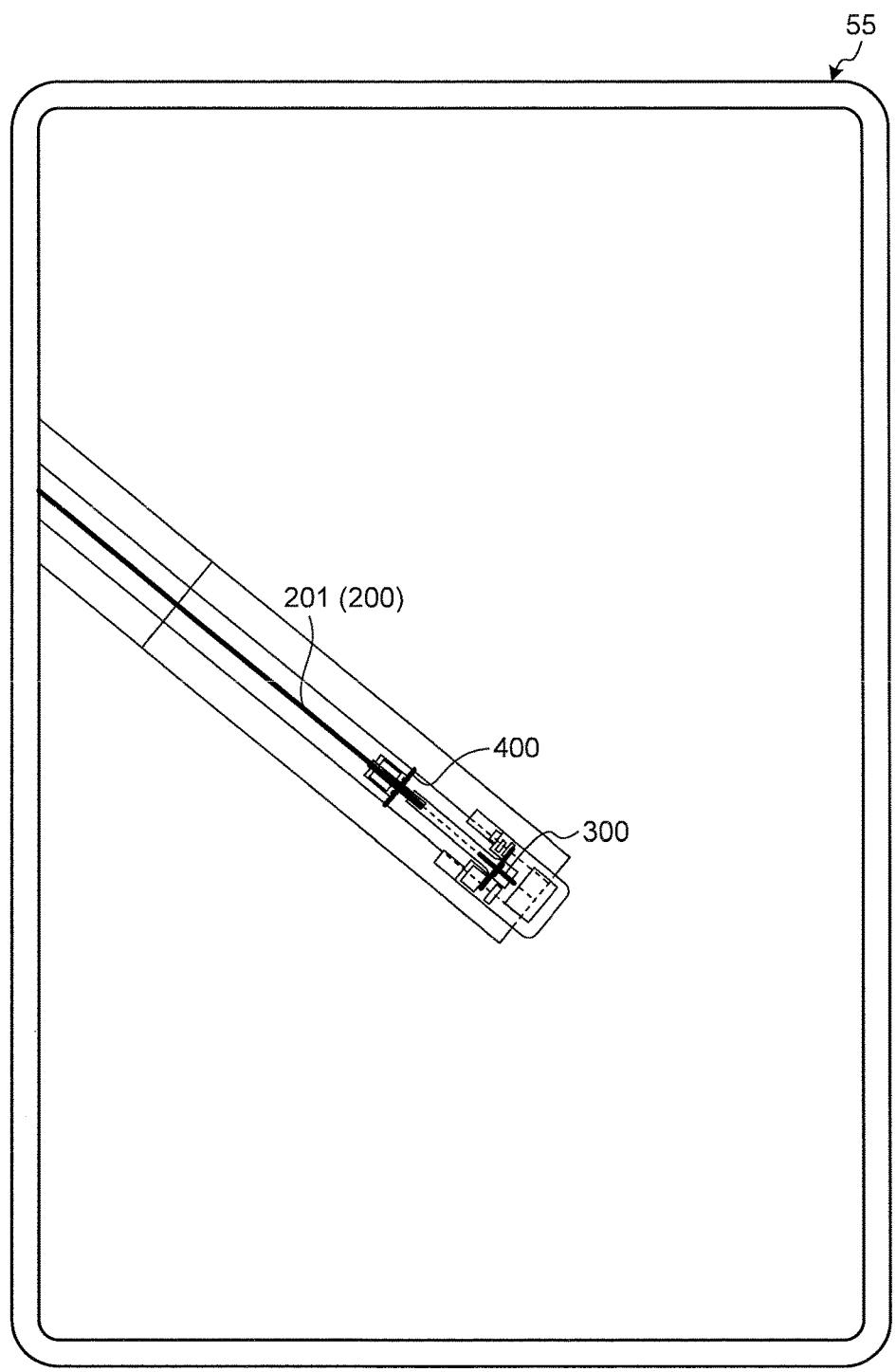
FIG. 9 is a diagram illustrating an example of the display system according to the first embodiment.

FIG. 9 is a diagram illustrating the display screen of the display unit 55 when the upper swing body 2 swings from a position illustrated in FIG. 8. When the upper swing body 2 swings, the top view image 2G indicating the upper swing body 2 and the lower travel body 3 displayed on the display screen of the display unit 55 also swings with the swinging of the upper swing body 2. The direction sensor 33 of the position detector 30 continuously monitors the direction of the upper swing body 2 defined by the global coordinate system. The vehicle body position data acquisition unit 61 continuously acquires the vehicle body direction data indicating the current direction of the upper swing body 2. Accordingly, the vehicle body image data generation unit 65 is able to generate the vehicle body image data for swinging the top view image 2G of the upper swing body 2 on the display screen in synchronization with the swinging of the upper swing body 2 based on the vehicle body direction data. The display controller 70 swings the top view image 2G of the upper swing body 2 on the display screen in synchronization with the swinging of the upper swing body 2. In this case, the part of the travel device 3 in the top view image 2G may not be displayed in a swing state even when the upper swing body 2 swings. For example, when a swing position detector is provided so as to detect the relative positional relation between the upper swing body 2 and the travel device 3, the parts of the upper swing body 2 and the travel device 3 in the top view image 2G can be displayed in response to the actual position.

Further, when the upper swing body 2 swings, the top view image 1G of the work machine 1 displayed on the display screen of the display unit 55 also swings with the swinging of the upper swing body 2. The blade tip position sensor 34 of the position detector 30 continuously monitors the current position Pb of the blade tip 10 defined by the global coordinate system. The vehicle body position data acquisition unit 61 continuously acquires the blade tip position data indicating the current position Pb of the blade tip 10. Accordingly, the blade tip image data generation unit 68 is able to generate the blade tip position image data for swinging the top view image 1G of the work machine 1 on the display screen in synchronization with the swinging of the upper swing body 2 based on the blade tip position data. The display controller 70 is able to swing the top view image 1G of the work machine 1 on the display screen in synchronization with the swinging of the upper swing body 2.

When the upper swing body 2 swings while the center guide line 201 indicating the center of the channel CH matches the index mark 300 indicating the swing axis RX of the upper swing body 2, the center guide line 201 indicating the center of the channel CH matches the index mark 400 indicating the center of the blade tip 10 as illustrated in FIG. 9. That is, when the upper swing body 2 swings while the center guide line 201 indicating the center of the channel CH matches the index mark 300 indicating the swing axis RX of the upper swing body 2, the center of the channel CH matches the center of the blade tip 10 of the bucket 11 in the vehicle width direction. Accordingly, it is possible to start an excavating process for forming the channel CH while the center of the channel CH in the width direction matches the center of the blade tip 10 of the bucket 11.

As described above, according to the embodiment, since the image 200 indicating the process position Pc of the process target processed by the work machine 1 and the image 300 indicating the specific position Ps are displayed on the display screen of the display system 60, the operator can smoothly perform a positioning operation between the process target and the excavator 100 moving to the process target by operating the operation unit 41 while seeing the display screen.

Further, in the embodiment, the top view image 2G indicating the upper swing body 2 is displayed on the display screen along with the image 200 indicating the process position Pc and the image 300 indicating the specific position Ps. For that reason, the operator can visually recognize the positional relation among the process position Pc, the specific position Ps, and the upper swing body 2.

Further, according to the embodiment, the top view image 2G indicating the upper swing body 2 and the image 300 indicating the specific position Ps are displayed on the display screen in a superimposed state. For that reason, the operator can smoothly perform the positioning operation between the process position Pc and the specific position Ps while seeing the top view image 2G superimposed on the image 300.

Further, according to the embodiment, the image 400 indicating the current position Pb of the blade tip 10 is displayed on the display screen along with the image 200 indicating the process position Pc and the image 300 indicating the specific position Ps. For that reason, the operator can visually recognize the positional relation among the process position Pc, the specific position Ps, and the blade tip 10.

Further, according to the embodiment, the center of the blade tip 10 in the axial direction (the vehicle width direction) of the rotation axis AX1 is displayed as the current position Pb of the blade tip 10. For that reason, the operator can visually recognize the positional relation among the center of the blade tip 10, the process position Pc, and the specific position Ps.

Further, according to the embodiment, the specific position Ps includes the swing axis RX of the upper swing body 2. For that reason, when the upper swing body 2 swings while the image 201 indicating the process position Pc matches the image 300 indicating the specific position Ps as described with reference to FIGS. 8 and 9, the highly precise positioning operation between the channel CH as the process target and the bucket 11 including the blade tip 10 is performed.

Further, according to the embodiment, the center of the channel CH constructed as the process position Pc by the work machine 1 in the width direction is displayed. For that reason, the operator can visually recognize the positional relation among the center of the channel CH in the width direction, the process position Pc, and the specific position Ps.

Further, according to the embodiment, the image 300 indicating the specific position Ps includes the index mark 300 displayed so as to be superimposed on the specific position Ps. Accordingly, the operator can visually and smoothly recognize the specific position Ps.

Further, according to the embodiment, an image indicating the process position Pc includes the guide line 200 displayed so as to be superimposed on the process position Pc. Accordingly, the operator can visually and smoothly recognize the process position Pc.

Second Embodiment

A second embodiment will be described. In the description below, the same reference sign will be given to the same or equivalent component as or to the component of the above-described embodiment, and the description thereof will be simplified or omitted.

Figure 10:
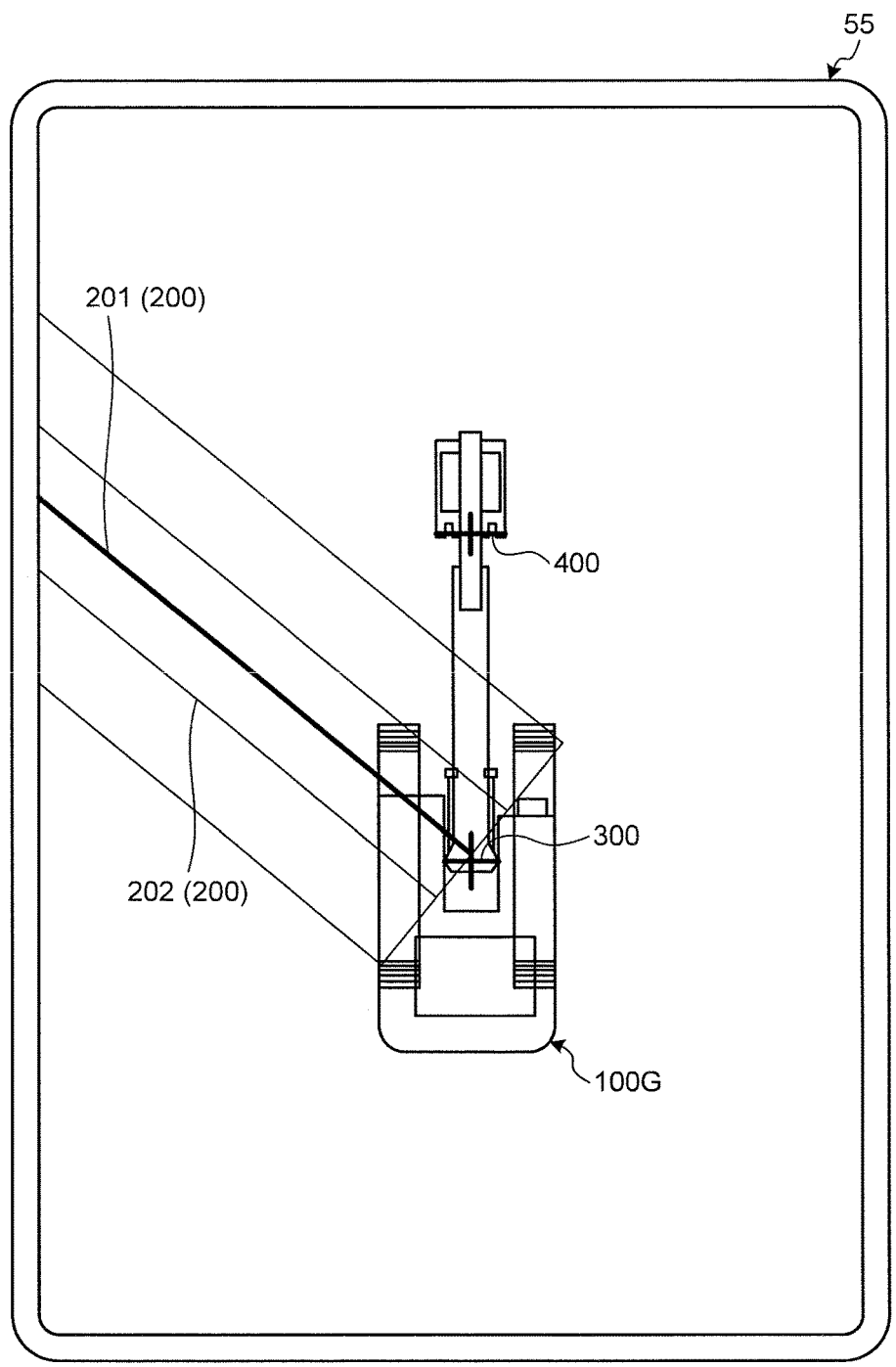
FIG. 10 is a diagram illustrating an example of a display system according to a second embodiment.

FIG. 10 is a diagram illustrating an example of a display system according to the embodiment and particularly an example of the top view image 100G indicating the excavator 100 including the top view image 2G indicating the upper swing body 2 and the top view image 1G indicating the work machine 1. As illustrated in FIG. 10, the top view image 100G may be displayed in a wire frame type indicating the shape of a plurality of components of the excavator 100. In the wire frame type, the image of the excavator 100 among a plurality of wires is transparent (so as not to be filled). An image indicating the channel CH and the ground surface as the process target is displayed through the top view image 100G. That is, it is possible to visually recognize the guide line 200 (201, 202) even in the superimposed part of the top view image 100G. Accordingly, the operator can easily cause the index mark 300 to match the center guide line 201 while seeing the display screen of the display unit 55.

Third Embodiment

A third embodiment will be described. In the description below, the same reference sign will be given to the same or equivalent component as or to the component of the above-described embodiment, and the description thereof will be simplified or omitted.

Figure 11:
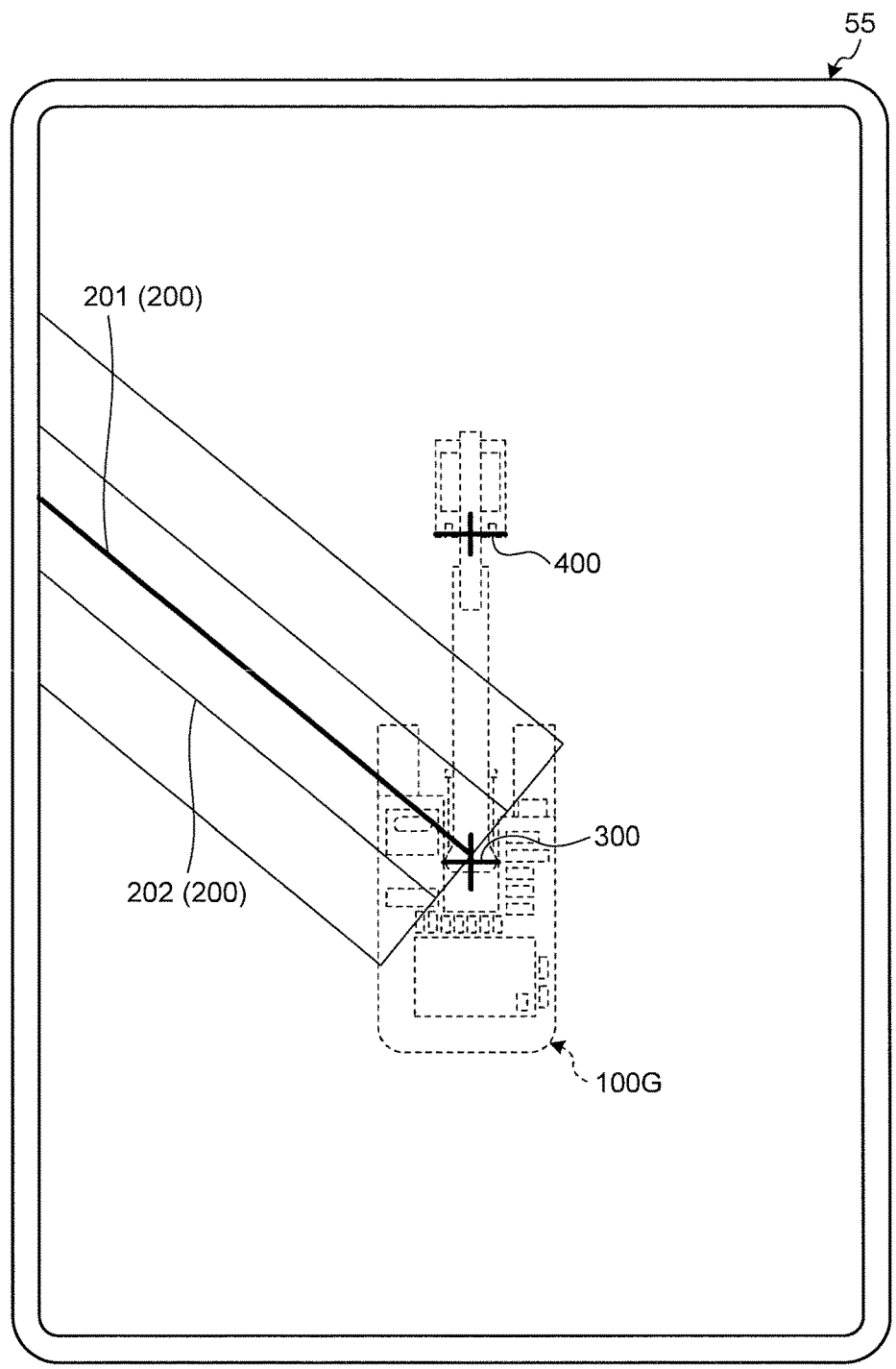
FIG. 11 is a diagram illustrating an example of a display system according to a third embodiment.

FIG. 11 illustrates an example of a display system according to the embodiment and particularly an example of the top view image 100G indicating the excavator 100. As illustrated in FIG. 11, in the top view image 100G, at least the outer shape of the excavator 100 may be displayed by a dashed line or a solid line, and the other part may be displayed in a transparent or semi-transparent color. In addition, the top view image 100G may be displayed in a semi-transparent color without displaying the outer shape. When the top view image is displayed in a semi-transparent color, an image indicating the excavator 100 is displayed in a light color. That is, the top view image 100G may be displayed so as to recognize the shape of the excavator 100. Even in such a case, since the guide line 200 (201, 202) can be visually recognized in the superimposed part of the top view image 100G, the operator can easily cause the index mark 300 to match the center guide line 201 while seeing the display screen of the display unit 55.

Fourth Embodiment

A fourth embodiment will be described. In the description below, the same reference sign will be given to the same or equivalent component as or to the component of the above-described embodiment, and the description thereof will be simplified or omitted.

Figure 12:
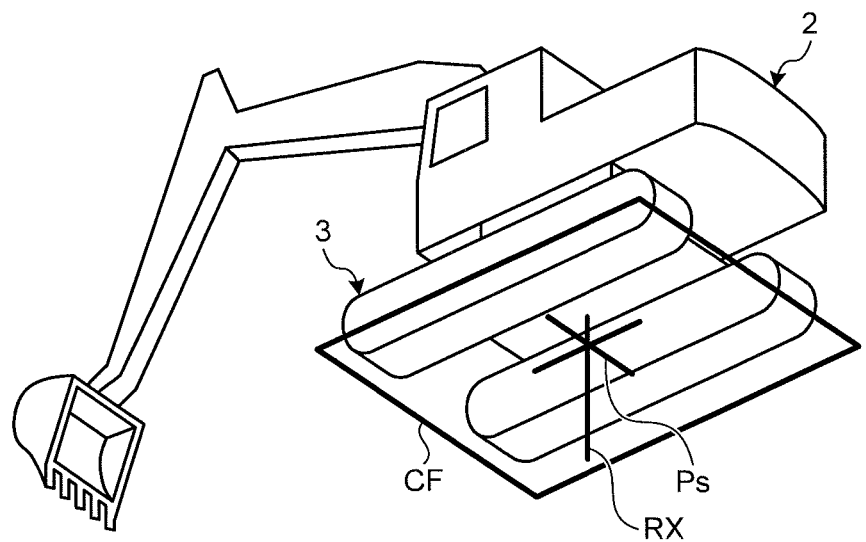
FIG. 12 is a schematic diagram illustrating a specific position according to a fourth embodiment.

In the embodiment, a modified example of a method of setting the specific position Ps will be described. FIG. 12 is a schematic diagram illustrating an example of a method of setting the specific position Ps according to the embodiment. In the above-described embodiments, the specific position Ps is set as the intersection point between the swing axis RX and the lower surface of the upper swing body 2. As illustrated in FIG. 12, the specific position Ps may be set as the intersection point between the swing axis RX and the plane including the tread CF of the lower travel body 3.

As illustrated in FIGS. 2 and 3, there is a possibility that the excavator 100 may be inclined (as pitching) in the front/back direction or be inclined (as rolling) in the vehicle width direction depending on the state of the ground shape of the construction area of the excavator 100 as illustrated in FIG. 2. As a result, the swing axis RX is inclined with respect to the horizontal plane (the XgYg plane). If the swing axis RX is inclined with the inclination of the excavator 100 when the specific position Ps is set as the upper swing body 2, the specific position Ps changes within the XgYg plane.

In the embodiment, as illustrated in FIG. 12, the specific position Ps is set as the intersection point between the swing axis RX and the plane including the tread CF of the lower travel body 3. That is, the specific position Ps is set as the intersection point between the swing axis RX and the ground surface on which the lower travel body 3 travels. The inclination of the plane including the tread CF of the lower travel body 3 is detected by the posture detection sensor 32. The current position of the swing axis RX substantially located at the same height as the installation position P1 is derived from the current position Pg of the upper swing body 2 detected by the vehicle body position sensor 31. A distance from the current position of the swing axis RX substantially located at the same height as the installation position P1 to the tread CF of the lower travel body 3 in a direction parallel to the swing axis RX is given data derived from the resource data of the excavator 100. Accordingly, the specific position calculation unit 64 can calculate the absolute position of the intersection point between the plane including the tread CF of the lower travel body 3 and the swing axis RX as the specific position Ps based on the detection result of the vehicle body position sensor 31, the detection result of the posture detection sensor 32, and the resource data of the excavator 100 stored in the storage unit 69.

In addition, in the first embodiment to the fourth embodiment, an example has been described which simultaneously displays the index mark 300 indicating the swing axis RX, the center guide line 201 indicating the center of the channel CH in the width direction, the edge guide line 202 indicating both ends (the channel width) of the channel CH in the width direction, and the index mark 400 indicating the center of the blade tip 10 in the width direction. Even when the process target is not the channel, an image indicating the construction process position and an image indicating the specific position may be displayed on the display unit 55 at the same time.

When the process target is the channel, for example, the index mark 300 indicating the swing axis RX and the edge guide line 202 indicating both ends (the channel width) of the channel CH in the width direction may be displayed while the center guide line 201 indicating the center of the channel CH in the width direction and the index mark 400 indicating the center of the blade tip 10 in the width direction are not displayed. Even in this case, the operator can smoothly perform the positioning operation of the excavator 100 when the excavator 100 enters the target position of the channel CH.

The index mark 300 indicating the swing axis RX and the center guide line 201 indicating the center of the channel CH in the width direction may be displayed while the edge guide line 202 indicating both ends (the channel width) of the channel CH in the width direction and the index mark 400 indicating the center of the blade tip 10 in the width direction are not displayed. Even in this case, the operator can smoothly perform the positioning operation of the excavator 100 when the excavator 100 enters the target position of the channel CH.

The index mark 300 indicating the swing axis RX, the center guide line 201 indicating the center of the channel CH in the width direction, and the edge guide line 202 indicating both ends (the channel width) of the channel CH in the width direction may be displayed while the index mark 400 indicating the center of the blade tip 10 is not displayed.

The index mark 300 indicating the swing axis RX, the edge guide line 202 indicating both ends (the channel width) of the channel CH in the width direction, and the index mark 400 indicating the center of the blade tip 10 in the width direction may be displayed while the center guide line 201 indicating the center of the channel CH in the width direction is not displayed.

The index mark 300 indicating the swing axis RX, the center guide line 201 indicating the center of the channel CH in the width direction, and the index mark 400 indicating the center of the blade tip 10 in the width direction may be displayed while the edge guide line 202 indicating both ends (the channel width) of the channel CH in the width direction is not displayed.

In addition, in the above-described embodiments, an example has been described in which the index mark 300 is disposed at the swing axis RX. Accordingly, when the upper swing body 2 swings after the index mark 300 matches the center guide line 201, the center of the blade tip 10 in the width direction may match the center of the channel CH in the width direction. In addition, there is a case in which the center position of the blade tip 10 in the width direction is different from the position of the swing axis RX in the vehicle width direction in the vehicle width direction as the axial direction of the rotation axis AX3. However, in many cases, a distance between the center position of the blade tip 10 in the vehicle width direction and the position of the swing axis RX in the vehicle width direction is, for example, several centimeters or less. In this way, since a distance between the center position of the blade tip 10 in the width direction and the position of the swing axis RX in the vehicle width direction is short, the center of the blade tip 10 may substantially match the center of the channel CH when the index mark 300 matches the center guide line 201.

In addition, the position of the index mark 300 is not limited to a position on the swing axis RX, and may be a position deviated from the swing axis RX in the vehicle width direction or the front/back direction. For example, the position of the index mark 300 in the vehicle width direction may be a position between the swing axis RX in the vehicle width direction and the center of the blade tip 10 in the width direction or a position matching the center of the blade tip 10 or the work machine 1 in the width direction. Further, the position of the index mark 300 in the front/back direction may be, for example, the position corresponding to the center position in the vehicle width direction, the position of the swing axis RX, the position of the rotation axis AX3, or the position between the swing axis RX and the rotation axis AX3. When the index mark 300 is displayed in this way, the position of the index mark 300 as an image indicating the specific position of the vehicle body 2 may be located in at least any position of the vehicle body 2 (on the top view image 2G).

Further, the position of the index mark 400 is not limited to the position at the center of the blade tip 10 in the width direction at the position of the blade tip 10 as illustrated in FIG. 6 and the like. The position of the index mark 400 may be a position different from the blade tip 10 as long as the position is the center in the width direction. In this way, the position of the index mark 400 may be set on the bucket 11 or near the bucket 11.

Further, the specific position Ps may be set based on the swing axis RX, and may be set as the specific position of the upper swing body 2 as the axial direction (the vehicle body width direction) of the rotation axis AX3. For example, the specific position Ps may include the center of the upper swing body 2 as the axial direction (the vehicle body width direction) of the rotation axis AX3. That is, the index mark 300 may be displayed so as to match the center of the upper swing body 2 in the vehicle width direction.

In addition, in the above-described embodiments, the index mark 300 or the index mark 400 is set as the cross mark. The lines forming the cross mark may be solid lines or dashed lines. Further, the index mark 300 or the index mark 400 may be a circle mark (a round-shaped mark) or a dot mark (a point-shaped mark). Further, the index mark 300 or the index mark 400 is not limited to the mark. For example, the color of the desired display part may be different from the peripheral color.

Figure 13:
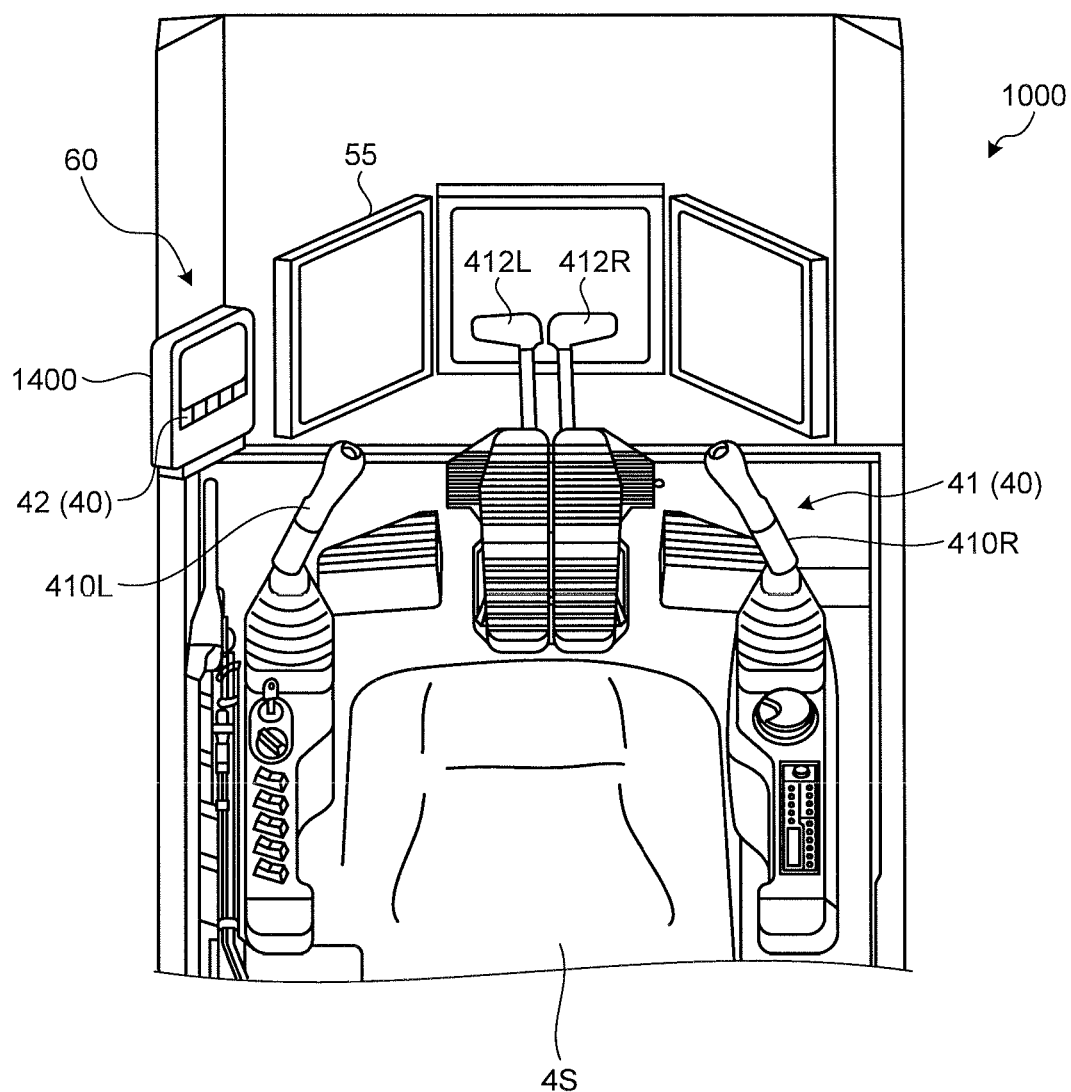
FIG. 13 is a diagram illustrating an example of a remote operation method of a construction machine.

In addition, in the above-described embodiments, the operation input device 40 and the display system 60 are provided in the excavator 100. The operation input device 40 and the display system 60 including the display unit 55 may be provided outside the upper swing body 2. For example, the operation input device 40 and at least the display unit 55 and the input/output unit 56 of the display system 60 may be disposed in a remote place separated from the excavator 100. That is, the excavator 100 may be remotely operated by the operation input device 40 provided in the remote place. FIG. 13 is a diagram illustrating an example of a method of remotely operating the excavator 100 from a remote operation room 1000. The remote operation room 1000 is provided in a remote place distant from the excavator 100. The remote operation room 1000 and the excavator 3 can communicate with each other according to a radio communication through a communication device. As illustrated in FIG. 13, the remote operation room 1000 is provided with a display system 60 including the display unit 55 and a monitor unit 1400, the driver seat 4S, and the operation input device 40 used to remotely operate the excavator 100.

The operation input device 40 provided in the remote operation room 1000 includes the operation unit 41 which generates an operation signal for operating the lower traveling body 3, the upper swing body 2, and the work machine 1 of the excavator 100 existing in a remote place and an input unit 42 which generates an input signal for operating the display system 60.

The operation unit 41 includes a right operation lever 410R, a left operation lever 410L, a right traveling lever 412R, and a left traveling lever 412L. When the operation unit 41 is operated, an operation signal is wirelessly transmitted to the excavator 100 based on the operation direction and the operation amount. Accordingly, the excavator 100 is remotely operated. In the embodiment, when the right operation lever 410R at a neutral position is inclined forward, the boom 13 moves downward. Meanwhile, when the right operation lever is inclined backward, the boom 13 moves upward. When the right operation lever 410R at a neutral position is inclined rightward, the dumping operation of the bucket 11 is performed. Meanwhile, when the right operation lever is inclined leftward, the raking operation of the bucket 11 is performed.

When the left operation lever 410L at a neutral position is inclined rightward, the upper swing body 2 swings rightward. Meanwhile, when the left operation lever is inclined leftward, the upper swing body 2 swings leftward. When the left operation lever 410L at a neutral position is inclined backward, the raking operation of the arm 12 is performed. Meanwhile, when the left operation lever is inclined forward, the arm 12 is lengthened. In addition, the relation between the inclination direction of the operation unit 41 and the operation direction of the work machine 1 or the upper swing body 2 may not be the above-described relation.

When the right traveling lever 412R at a neutral position is inclined forward, the right crawler 7 moves forward. Meanwhile, when the right traveling lever is inclined backward, the right crawler 7 moves backward. When the left traveling lever 412L at a neutral position is inclined forward, the left crawler 7 moves forward. Meanwhile, when the left traveling lever is inclined backward, the left crawler 7 moves backward.

The input unit 42 includes an input device such as an input button, a keyboard, and a touch panel operated by the operator in the remote operation room 1000. When the input unit 42 is operated, an input signal for operating the display system 60 is output from the input unit 42.

The display unit 55 includes a flat panel display such as a liquid crystal display or an organic electroluminescent display. The operator in the remote operation room 1000 can operate the operation input device 40 while seeing the display screen of the display unit 55.

The operator in the remote place can control the traveling of the lower travel body 3, the swinging of the upper swing body 2, and the working of the work machine 1 in the excavator 100 by controlling the controller 50 through the operation of the operation input device 40 while seeing the display unit 55 of the display system 60 disposed in the remote place. In this case, the detection result of the vehicle body position sensor 31, the posture detection sensor 32, the direction sensor 33, and the blade tip position sensor 34 provided in the excavator 100 are transmitted to the input/output unit 56 of the display system 60 disposed in the remote place through a radio communication. The input/output unit 56 disposed in the remote place can display the process position image and the specific position image on the display screen of the display unit 55 disposed in the remote place based on, for example, the vehicle body position data supplied from the vehicle body position sensor 31 and the process position data generated by the construction data generation device 57. Further, the operation signal of the operation unit 41 is supplied to the travel controller 51, the swing controller 52, and the work machine controller 53 provided in the excavator 100 through a radio communication. The operator in the remote place can operate the operation unit 41 while seeing the display screen of the display unit 55 disposed in the remote place.

Figure 14:
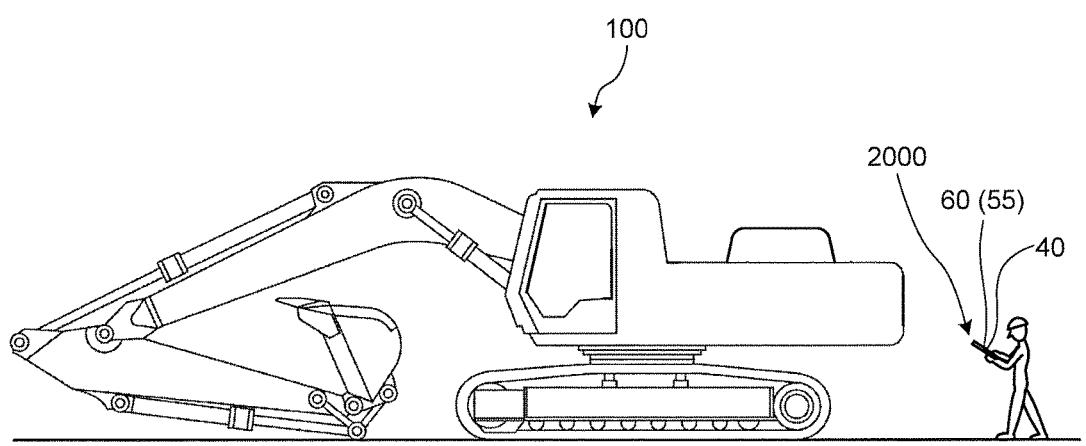
FIG. 14 is a diagram illustrating an example of a remote operation method of a construction machine.

FIG. 14 is a diagram illustrating a method of remotely operating the excavator 100 by a portable terminal device 2000. The portable terminal device 2000 includes the display system 60 which includes the display unit 55 and the operation input device 40 which remotely operates the excavator 100.

In addition, in the above-described embodiments, an example has been described in which the construction machine is the excavator 100. The construction machine may be a bulldozer 100B illustrated in FIG. 15. Similarly to the excavator 100, the bulldozer 100B also includes a vehicle body 2B which supports a work machine 1B, a cab 4B, and a travel device 3B which travels while supporting the vehicle body 2. The work machine 1B includes a blade 11B which corresponds to a working member with a blade tip 10B and an arm 12B which corresponds to a connection member connecting the blade 11B and the vehicle body 2B to each other. The work machine 1B is driven by a hydraulic cylinder 20B. The working member 11B is supported by the arm 12B so as to move up and down about a rotation axis AX3B. The arm 12B of the work machine 1B is supported by the vehicle body 2B through the connection member provided in the rotation axis AX3B. When the construction machine is the bulldozer 100B, the specific position Ps is set as, for example, the center of the vehicle body 2B in the vehicle width direction as the axial direction of the rotation axis AX3B.

In addition, in the above-described embodiments, an example of the computer aided construction has been described in which the construction is performed based on the design topography data indicating the channel CH. Even in the actual channel in which the channel CH is being formed, the display system 60 can be employed by using the design topography data indicating the channel CH which is being formed by setting the channel as the process target.

In addition, in the above-described embodiments, an example has been described in which the work machine 1 enters the channel CH of the ground surface as the process target constructed by the work machine in the construction area of the construction site. That is, the process target is set as an object such as a ground surface constructed by the work machine 1. When the process target is a transportation vehicle, a trailer, a parking place, or a maintenance place as below and data indicating these positions (the process position Pc) is used for the display system 60 of the above-described embodiments, the work can be efficiently performed. In such a case, the blade tip position data acquisition unit 63 or the blade tip position image data generation unit 68 of the display system 60 may not be provided.

For example, if the display system 60 of the above-described embodiments is used when a load is loaded in a transportation vehicle such as a dump truck by the work machine of the construction machine, the positioning operation between the construction machine and the transportation vehicle as the process target can be highly precisely performed. Further, there is a case in which the construction machine is loaded on a trailer when the construction machine is moved to a far place. However, the construction machine can be appropriately loaded on a cargo of the trailer by using the display system 60 of the above-described embodiment. That is, the operator of the construction machine can load the construction machine on the trailer while highly precisely performing the positioning operation between the construction machine and the trailer as the process target through the display system 60.

Further, if the display system 60 of the above-described embodiment is used when the construction machine is moved to a predetermined parking place and the construction machine is disposed at a specific installation position of the parking place, the positioning operation between the construction machine and the parking place as the process target can be highly precisely performed. Further, if the display system 60 of the above-described embodiments is used when the construction machine is moved to a maintenance place and the construction machine or the work machine is disposed at a specific maintenance position, the positioning operation between the construction machine or the work machine and the maintenance place as the process target can be highly precisely performed.

REFERENCE SIGNS LIST 1 work machine
1G top view image
2 vehicle body (upper swing body)
2G top view image
3 travel device (lower travel body)
4 cab
4S driver seat
5 machine room
6 handrail
7 crawler
10 blade tip
11 bucket
12 arm
13 boom
14 bucket cylinder stroke sensor
15 arm cylinder stroke sensor
16 boom cylinder stroke sensor
20 hydraulic cylinder
21 bucket cylinder
22 arm cylinder
23 boom cylinder
30 position detector
31 vehicle body position sensor
31A GPS antenna
32 posture detection sensor
33 direction sensor
34 blade tip position sensor
40 operation input device
41 operation unit
42 input unit
50 controller
51 travel controller
52 swing controller
53 work machine controller
54 display controller
55 display unit
56 input/output interface device (input/output unit)
57 construction data generation device
60 display system
61 vehicle body position data acquisition unit
62 process position data storage unit
63 blade tip position data acquisition unit
64 specific position calculation unit
65 vehicle body image data generation unit
66 process position image data generation unit
67 specific position image data generation unit
68 blade tip position image data generation unit
69 storage unit
70 display controller
100 excavator (construction machine)
100G top view image
200 guide line
201 center guide line
202 edge guide line
300 index mark
400 index mark
AX1 rotation axis
AX2 rotation axis
AX3 rotation axis
CH channel
Pc process position
Pg absolute position
Ps specific position
RX swing axis

The invention claimed is:

1. A display system comprising:
a display unit which displays an image;
a vehicle body position data acquisition unit which acquires vehicle body position data indicating a position of a vehicle body supporting a work machine;
a process position data storage unit which stores process position data indicating a process position of a process target processed by the work machine; and
a display controller which displays an image indicating the process position based on the process position data on the display unit along with a top view image of a construction machine based on the vehicle body position data and displays, on the top view image, an image indicating a specific position representing a positional relation between the process position;
wherein the work machine includes a working member including a blade tip and a connection member connecting the working member and the vehicle body to each other,
wherein the display system further comprises a blade tip position data acquisition unit which acquires blade tip position data indicating a position of the blade tip, and wherein the display controller displays an image indicating the position of the blade tip based on the blade tip position data on the display unit along with the image indicating the process position and the image indicating the specific position.

2. The display system according to claim 1, wherein the display controller displays the top view image on the display unit along with the image indicating the specific position.

3. The display system according to claim 1, wherein the process position includes a center of a channel constructed by the work machine in a width direction.

4. The display system according to claim 1, wherein the vehicle body includes an upper swing body which is able to swing about a swing axis while being supported by a lower travel body, and wherein the specific position includes the swing axis of the upper swing body.

5. A display system which is mounted on an excavator including a work machine and a vehicle body supporting the work machine,
wherein the work machine includes a working member including a blade tip and a connection member connecting the working member and the vehicle body to each other,
wherein the vehicle body includes an upper swing body which is able to swing about a swing axis while being supported by a lower travel body,
wherein the display system comprises:
a display unit which displays an image;
a vehicle body position data acquisition unit which acquires vehicle body position data indicating a position of the vehicle body;
a process position data storage unit which stores process position data indicating a process position of a process target including a center of a channel constructed by the work machine in a width direction;
a blade tip position data acquisition unit which acquires blade tip position data indicating a position of the blade tip; and
a display controller which displays an image indicating the process position based on the process position data, on the display unit along with a top view image of a construction machine based on the vehicle body position data and displays, on the top view image, an image indicating a specific position representing a positional relation between the process position and the construction machine and a top view image indicating the position of the blade tip based on the blade tip position data in the top view displayed and representing a positional relation between the position of the blade, the process position and the specific position in the top view on the display unit together.

6. The display system according to claim 1, wherein the display unit and an input/output unit are provided outside the vehicle body.

7. A construction machine comprising: the display system according to claim 1.

8. The display system according to claim 2,
wherein the work machine includes a working member including a blade tip and a connection member connecting the working member and the vehicle body to each other,
wherein the display system further comprises a blade tip position data acquisition unit which acquires blade tip position data indicating a position of the blade tip, and
wherein the display controller displays an image indicating the position of the blade tip based on the blade tip position data in the top view displayed on the display unit along with the image indicating the process position and the image indicating the specific position.

9. The display system according to claim 1,
wherein the work machine includes a working member including a blade tip and a connection member connecting the working member and the vehicle body to each other,
wherein the display system further comprises a blade tip position data acquisition unit which acquires blade tip position data indicating a position of the blade tip, and
wherein the display controller displays an image indicating the position of the blade tip based on the blade tip position data in the top view displayed on the display unit along with the image indicating the process position and the image indicating the specific position.

10. The display system according to claim 2, wherein the process position includes a center of a channel constructed by the work machine in a width direction.

11. The display system according to claim 1, wherein the process position includes a center of a channel constructed by the work machine in a width direction.

12. The display system according to claim 1, wherein the process position includes a center of a channel constructed by the work machine in a width direction.

13. The display system according to claim 2, wherein the vehicle body includes an upper swing body which is able to swing about a swing axis while being supported by a lower travel body, and wherein the specific position includes the swing axis of the upper swing body.

14. The display system according to claim 1,
wherein the vehicle body includes an upper swing body which is able to swing about a swing axis while being supported by a lower travel body, and
wherein the specific position includes the swing axis of the upper swing body.

15. The display system according to claim 2, wherein the display unit and an input/output unit are provided outside the vehicle body.

16. The display system according to claim 5, wherein the display unit and an input/output unit are provided outside the vehicle body.

17. A construction machine comprising: the display system according to claim 2.

18. A construction machine comprising: the display system according to claim 5.

* * * * *